United States Patent
Miller et al.

(10) Patent No.: US 7,898,576 B2
(45) Date of Patent: Mar. 1, 2011

(54) METHOD AND SYSTEM FOR INDEXING AND SEARCHING OBJECTS OF INTEREST ACROSS A PLURALITY OF VIDEO STREAMS

(75) Inventors: Ben A. Miller, Minneapolis, MN (US);
Isaac Cohen, Minnetonka, MN (US);
Yunqian Ma, Roseville, MN (US);
Roland Mieszianko, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 613 days.

(21) Appl. No.: 11/845,439

(22) Filed: Aug. 27, 2007

(65) Prior Publication Data
US 2008/0204569 A1      Aug. 28, 2008

Related U.S. Application Data

(63) Continuation-in-part of application No. 11/680,347, filed on Feb. 28, 2007.

(51) Int. Cl.
*H04N 5/228*  (2006.01)
*H04N 5/76*   (2006.01)

(52) U.S. Cl. .................. 348/222.1; 348/231.3

(58) Field of Classification Search .............. 348/222.1, 348/231.2–231.3
See application file for complete search history.

(56) References Cited

U.S. PATENT DOCUMENTS

| | | | |
|---|---|---|---|
| 5,568,192 A | 10/1996 | Hannah | |
| 6,954,544 B2 | 10/2005 | Jepson et al. | |
| 7,636,450 B1 * | 12/2009 | Bourdev | 382/100 |
| 2007/0047811 A1 * | 3/2007 | Itoh et al. | 382/173 |
| 2007/0092110 A1 * | 4/2007 | Xu et al. | 382/103 |

(Continued)

FOREIGN PATENT DOCUMENTS

EP      0805405      11/1997

(Continued)

OTHER PUBLICATIONS

Porikli F. et al.: "Covariance Tracking using Model Update Based on Lie Algebra" Computer Vision and Pattern Recognition, 2006 IEEE Computer Society Conference On New York, NY, USA Jun. 17-22, 2006, Piscataway, NJ, USA IEEE, vol. 1, Jun. 17, 2006, pp. 728-735. ISBN: 978-0-7695-2597-6. Entire Document.

(Continued)

*Primary Examiner*—Sinh Tran
*Assistant Examiner*—Hung H Lam
(74) *Attorney, Agent, or Firm*—Schwegman, Lundberg & Woessner P.A.

(57) ABSTRACT

A seed search of a subset of analytical data corresponding to video objects displayable in a plurality of video frames is carried out to identify video objects that most closely match a selected video object and then complete searches of the analytical data may be carried out so as to identify video objects that most closely match each video object identified during the seed search. The video objects having the greatest number of occurrences of being identified during the complete searches may be displayed by a graphical user interface (GUI). In this way, the GUI may display the video objects in an order based on how closely each video object matches the selected video object and/or a video object identified during the seed search, which may an order different than an order based on a time when each video object was captured.

12 Claims, 11 Drawing Sheets

U.S. PATENT DOCUMENTS

| | | | |
|---|---|---|---|
| 2007/0098303 A1* | 5/2007 | Gallagher et al. | 382/305 |
| 2008/0226127 A1* | 9/2008 | Brodsky et al. | 382/103 |
| 2009/0034791 A1* | 2/2009 | Doretto et al. | 382/103 |
| 2009/0169168 A1* | 7/2009 | Ishikawa | 386/52 |
| 2009/0175502 A1* | 7/2009 | Bushell et al. | 382/103 |

FOREIGN PATENT DOCUMENTS

| | | |
|---|---|---|
| EP | 1184810 | 3/2002 |
| WO | WO-03067884 A1 | 8/2003 |
| WO | WO-2006097680 A1 | 9/2006 |
| WO | WO-2006097681 A1 | 9/2006 |

OTHER PUBLICATIONS

International Search Report for International Application No. PCT/US2008/055245, mailed Feb. 17, 2009.

U.S. Appl. No. 11/680,347, filed Feb. 28, 2007.

RFC Services, Visual Hindsight IP Video Surveillance, downloaded from the World Wide Web at http://www.visualhindsight.com/press_kit.htm on May 14, 2007.

Video Analytics, Video Analytics Terminology, downloaded from the World Wide Web at http://www.videoanalytics.org/pages/terminology.htm on May 4, 2007.

"U.S. Appl. No. 11/680,347, Non-Final Office Action mailed May 24, 2010", 8 pgs.

"U.S. Appl. No. 11/680,347, Response filed Jul. 21, 2010 to Non Final Office Action mailed May 24, 2010", 12 pgs.

"U.S. Appl. No. 11/680,347, Response filed Jul. 21, 2010 to Non-Final Office Action w/ Restriction Requirement mailed May 24, 2010", 13 pgs.

"International Application No. PCT/US2008/055245, Written Opinion mailed Feb. 17, 2009", 9 pgs.

Porikli, F., et al., "Covariance Tracking using Model Update Based on Lie Algebra", Proceedings of the 2006 IEEE Computer Society Conference on Computer Vision and Pattern Recognition, IEEE Computer Conference on New York, vol. 1. No. 1, (Jun. 2006), 728-735 pgs.

"U.S. Appl. No. 11/680,347 Final Office Action mailed Aug. 13, 2010", 7 pgs.

* cited by examiner

| VF No. | Video Object No. | | VF No. | Video Object No. |
|---|---|---|---|---|
| 1,000 | 1 | | 3,000 | 221 |
| 1,001 | 2 | | 3,001 | 222, 223 |
| 1,002 | 3 | | 3,002 | 224, 225 |
| 1,003 | 4 | | 3,003 | 226 |
| 1,004 | 5 | | 3,004 | 227, 228 |
| 1,005 | 6, 7, 8 | | 3,005 | 229, 230 |
| 1,006 | 9,10,11,31,32,33,34 | | 3,006 | 231,232,233,247,248 |
| 1,007 | 12, 13 | | 3,007 | 234 |
| 1,008 | 14 | | 3,008 | 235 |
| 1,009 | 15, 16, 26, 27 | | 3,009 | 236, 237, 251, 252 |
| 1,010 | 17 | | 3,010 | 238 |
| 1,011 | 18, 19 | | 3,011 | 239, 240, 249, 250 |
| 1,012 | 20, 21 | | 3,012 | 241,242 |
| 1,013 | 22 | | 3,013 | 243 |
| 1,014 | 23, 24, 28, 29, 30 | | 3,014 | 244, 245 |
| 1,015 | 25 | | 3,015 | 246 |

VF cap. by VC 170 — 202

VF cap. by VC 174 — 206

| VF No. | Video Object No. | | VF No. | Video Object No. |
|---|---|---|---|---|
| 2,000 | 111, 137, 138 | | 4,000 | 318, 319 |
| 2,001 | 112 | | 4,001 | 320, 321 |
| 2,002 | 113,114,115,139,140,142 | | 4,002 | 322 |
| 2,003 | 116, 117 | | 4,003 | 323, 324 |
| 2,004 | 118 | | 4,004 | 325 |
| 2,005 | 119, 120, 121, 141 | | 4,005 | 326, 327, 328 |
| 2,006 | 122 | | 4,006 | 329, 330, 331 |
| 2,007 | 123, 124 | | 4,007 | 332, 333 |
| 2,008 | 125 | | 4,008 | 334 |
| 2,009 | 126, 127 | | 4,009 | 335, 336 |
| 2,010 | 128 | | 4,010 | 337 |
| 2,011 | 129, 130 | | 4,011 | 338, 339 |
| 2,012 | 131, 132 | | 4,012 | 340, 341 |
| 2,013 | 133 | | 4,013 | 342 |
| 2,014 | 134, 135 | | 4,014 | 343, 344, 346 |
| 2,015 | 136 | | 4,015 | 345 |

VF cap. by VC 172 — 204

VF cap. by VC 176 — 208

|     | M1 | M2 | M3 | M4 | M5 | M6 | M7 | M8 | M9 |
| --- | --- | --- | --- | --- | --- | --- | --- | --- | --- |
| M1  | 0  | 9  | 13 | 5  | 2  | 7  | 8  | 12 | 8  |
| M2  | 9  | 0  | 9  | 8  | 9  | 11 | 10 | 5  | 9  |
| M3  | 13 | 9  | 0  | 2  | 5  | 15 | 7  | 19 | 10 |
| M4  | 5  | 8  | 2  | 0  | 4  | 12 | 7  | 9  | 12 |
| M5  | 2  | 9  | 5  | 4  | 0  | 2  | 12 | 8  | 13 |
| M6  | 7  | 11 | 15 | 12 | 2  | 0  | 4  | 5  | 3  |
| M7  | 8  | 10 | 7  | 7  | 12 | 4  | 0  | 8  | 6  |
| M8  | 12 | 5  | 19 | 9  | 8  | 5  | 8  | 0  | 9  |
| M9  | 8  | 9  | 10 | 12 | 13 | 3  | 6  | 9  | 0  |

Figure 9

METHOD AND SYSTEM FOR INDEXING AND SEARCHING OBJECTS OF INTEREST ACROSS A PLURALITY OF VIDEO STREAMS

RELATED APPLICATIONS

This application is a continuation-in-part application of U.S. patent application Ser. No. 11/680,347, filed on Feb. 28, 2007 and entitled "Video Data Matching Using Clustering on Covariance Appearance." This application claims priority to U.S. patent application Ser. No. 11/680,347 and incorporates by reference U.S. patent application Ser. No. 11/680,347 in its entirety.

GOVERNMENT RIGHTS

This invention was made with government support under a Homeland Security Advanced Research Project Agency (HSARPA) program, contract N001405C0119, which is sponsored by the Office of Navy Research. The U.S. Government may have certain rights in this invention.

FIELD OF INVENTION

The present invention relates to the analysis of video data, and more particularly to searching objects of interest in video streams captured by multiple video cameras.

DESCRIPTION OF RELATED ART

As advancements in video security systems are being made, video security systems are being installed in a greater number of locations, such as airports, casinos, hospitals, schools, and shopping malls. One effect of these additional video security systems is the increased number of video frames that need to be monitored and/or analyzed. Fortunately, video analytic systems are currently available to assist a user in monitoring and/or analyzing video frames.

In one respect, current video analytic systems are operable to allow a user to view video frames captured by a plurality of video cameras so as to (i) locate an object of interest displayed in at least one of the video frames, and (ii) determine whether the object of interest appeared later or earlier in any other video frames. Even so, the process of viewing video frames to locate the object of interest may be very time consuming when the video frames were captured by one video camera, and even more time consuming when the video frames were captured by a plurality of video cameras.

In another respect, current video analytic systems are operable to display analytic data overlaid on video frames or to display analytical data and video frames corresponding to the analytical data. Such video analytic systems may receive video frames from a plurality of video cameras. However, these current video analytic systems still require an operator to monitor all video frames from all of the video cameras.

In yet another respect, current video analytic systems may carry out analytics based on motion detection such that the systems only display or record video frames in which a video object is in motion. While these systems may reduce the number of video frames a user must monitor, they do not provide for finding an object captured by different video cameras or that appears in different video frames captured by the same video camera.

SUMMARY

The present invention provides for a novel method, computer-readable medium, and system for searching analytical data corresponding to video objects displayable in a video frame and for displaying and/or interacting with video frames comprising video objects identified during searches of the analytical data. A seed search may be carried out on a subset of the analytical data so as to identify video objects that most closely match a selected video object and complete searches of the analytical data may be carried out on all of the analytical data so as to identify video objects that most closely match the selected video object and/or a video object identified during the seed search. A number (e.g., a predetermined percentage) of video frames identified during the complete searches may be displayed at a graphical user interface.

In one respect, an exemplary embodiment of the present invention may take the form of a method that includes: (i) storing a plurality of video frames and analytical data corresponding to a plurality of video objects, wherein each video object of the plurality of video objects is displayable by displaying a video frame of the plurality of video frames that comprises that video object, (ii) receiving a selection of a video object displayable in a given video frame of the plurality of video frames, (iii) searching a subset of the analytical data so as to identify a number of video objects that most closely match the selected video object and to create a first list, wherein the first list identifies the number of video objects that most closely match the selected video object, (iv) for each video object identified in the first list, searching the analytical data so as to identify video objects of the plurality of video objects that most closely match that video object identified in the first list, (v) for each identified video object that most closely matches a video object identified in the first list, counting a number of occurrences that that video object is identified as a video object that most closely matches a video object identified in the first list, (vi) creating a second list, wherein the second list indicates the counted number of occurrences for each identified video object that most closely matches a video object identified in the first list, and (vii) using the second list to identify a set of video frames of the plurality of video frames to be displayed. A computer-readable medium may comprise program instructions executable by a processor to carry out this method.

In another respect, an exemplary embodiment of the present invention may take the form of a method that includes: (i) storing a plurality of video frames and analytical data corresponding to a plurality of video objects, wherein each video object of the plurality of video objects is displayable by displaying a video frame of the plurality of video frames that comprises that video object, (ii) receiving a selection of a first video object displayable in a given video frame of the plurality of video frames, (iii) searching the analytical data for video objects that most closely match the first video object so as to identify a first set of video frames, wherein each video frame of the first set of video frames comprises at least one video object that most closely matches the first video object, (iv) displaying at least a portion of the first set of video frames, (v) receiving a selection of a second video object displayed in at least one frame of the displayed portion of the first set of video frames, (vi) searching the analytical data for video objects that most closely match the second video object so as to identify a second set of video frames, wherein each video frame of the second set of video frames comprises at least one video object that most closely matches the second video object, and (vii) displaying at least a portion of the second set of video frames. A computer-readable medium may comprise program instructions executable by a processor to carry out this method.

In yet another respect, an exemplary embodiment of the present invention may take the form of a system comprising:

(i) a processor, (ii) data storage for storing: (a) a plurality of video frames, (b) analytical data corresponding to a plurality of video objects, and (c) program instructions executable by the processor; and (iii) a user interface to display video frames and to receive a selection of a video object displayed in a given video frame of the plurality of video frames. The plurality of video objects is displayable by displaying the plurality of video frames via the user interface. The program instructions comprise instructions that cause the processor to: (i) search a subset of the analytical data so as to identify a number of video objects that most closely match the selected video object and to create a first list, wherein the first list identifies the number of video objects that most closely match the selected video object, (ii) for each video object identified in the first list, search the analytical data so as to identify video objects of the plurality of video objects that most closely match that video object identified in the first list, (iii) for each identified video object that most closely matches a video object identified in the first list, count a number of occurrences that that video object is identified as a video object that most closely matches a video object identified in the first list, (iv) create a second list, wherein the second list indicates the counted number of occurrences for each identified video object that most closely matches a video object identified in the first list, and (v) use the second list to identify a set of video frames of the plurality of video frames to be displayed.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which:

FIG. 2 illustrates exemplary data that may be stored in a data storage device in accordance with an exemplary embodiment of the invention;

FIG. 9 illustrates an example embodiment of a covariance matrix for use in connection with sequence matching in video data using clustering as a function of covariance appearance;

Reference numerals are shown in the drawings to identify various elements of the drawings. Drawing elements having identical reference numerals are substantially identical or identical elements.

DETAILED DESCRIPTION

1. Overview

Figure 1:
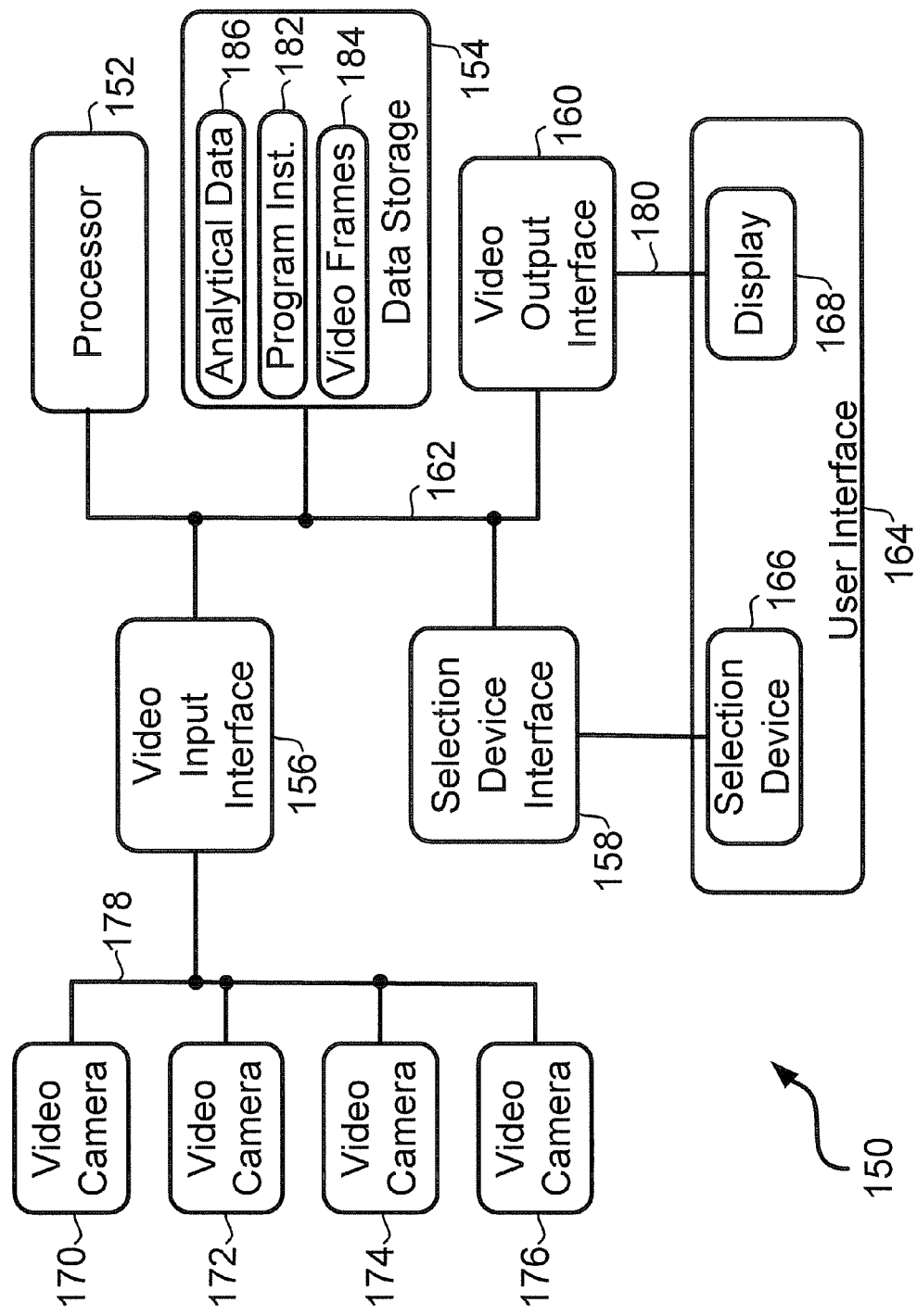
FIG. 1 is a block diagram of a system in which an exemplary embodiment of the invention may be carried out.

The present invention is directed to a novel method, computer-readable medium, and system for searching analytical data corresponding to video objects displayable in a video frame and for displaying and/or interacting with video frames comprising video objects identified during the search of the analytical data.

Each video object is included in only one frame. In this regard, each video object is unique. However, multiple video frames may include a video object that represents a particular object captured on the video frames, and the multiple video frames may be captured by one or more video cameras. A particular object captured on a video frame may include a person, a group of people, an item carried by a person or the group of people, an animal, a vehicle, or some other arbitrary object that may be captured on a video frame (e.g., any object within a video frame). Analytical data may be determined for video objects that are detected as being in motion at the time the video objects are captured. Any video object of interest to a user may be selected by the user while a video frame comprising that video object is being displayed.

A "seed search" (i.e., a search of a subset of the analytical data) may be carried out so as to identify video objects that most closely match the selected video object. The identified video objects that most closely match the selected video object may include the selected video object. The subset of analytical data may comprise analytical data for which there is a high probability that the data will correspond to video objects that most closely match the selected video object.

A "complete search" (i.e., a search of the entire set of analytical data) may be carried out for each of the video objects identified during the seed search so as to identify video objects that most closely match the video objects identified during the seed search. Thereafter, the video frames comprising the video objects identified during the complete searches may be displayed at a display device.

After performance of the seed search and the complete searches, a user may view video frames in which the selected video object appears and/or video frames in which a video object identified as one of a plurality of video objects most closely matching the selected video object appear, without having to view video frames in which the selected video object or video objects identified as most closely matching the selected video object do not appear. In this way, the user does not have to waste time viewing video frames that are not of interest to the user.

Additionally, while viewing the video frames comprising video objects detected during a seed search and/or a complete search, the user may select another video object displayed in a viewed video frame. The other video object may comprise an object that interacts with the previously selected video object. Thereafter, the system may perform a seed search for the other video object so as to detect video objects that most closely match the other video object, and then perform one or more complete searches for video objects that most closely match the detected video object that most closely matches the other video object. Video frames comprising the other video object and/or video objects that most closely match the other video object may be displayed at the display device.

2. Exemplary Architecture

FIG. 1 is a block diagram of a system 150 arranged to carry out the present invention. It should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

As shown in FIG. 1, system 150 includes a processor 152, data storage 154, a video input interface 156, a selection device interface 158, and a video output interface 160, all linked together via a system bus, network, or other connection mechanism 162. System 150 also includes (i) a user interface 164 including a selection device 166 and a display 168, (ii) a first video camera 170, (iii) a second video camera 172, (iv) a third video camera 174, and (v) a fourth video camera 176. Alternatively, system 150 may comprise a number of video cameras greater than or less than four video cameras.

Video cameras 170, 172, 174, 176 may each comprise any of a variety of video cameras for capturing a plurality of video frames and for providing the plurality of video frames to the video input interface 156. Each video frame comprises data representing an image. The video cameras 170, 172, 174, 176 may capture video frames at a given frame rate, such as 30 frames per second or at a frame rate greater than or less than 30 frames per second.

Video cameras 170, 172, 174, 176 may be located at any of a variety of locations. Video cameras 170, 172, 174, 176 may be located indoors or outdoors. As an example, video cameras 170, 172 may be located indoors (e.g., within a hospital) and video cameras 174, 176 may be located outdoors (e.g., at a parking lot of the hospital). As another example, video cameras 170, 172, 174, 176 may be located at a school, a prison, an airport, or a park. Other exemplary locations of video cameras 170, 172, 174, 176 are also possible.

Two or more of video cameras 170, 172, 174, 176 may capture video frames of a common coverage area (i.e., an overlapping coverage area). The video cameras that capture video frames of a common coverage area may be referred to as overlapping cameras. Alternatively or additionally, two or more of video cameras 170, 172, 174, 176 may capture video frames in distinct coverage areas (i.e., non-overlapping coverage areas). The video cameras that capture video frames of distinct coverage areas may be referred to as non-overlapping cameras.

Video input interface 156 may comprise an input that receives video frames captured by video cameras 170, 172, 174, 176 and an output that provides the received video frames to system bus 162 for transmission, in turn, to data storage 154, processor 152, and/or video output interface 160. The video frames received at video input interface 156 may be transmitted to (i) data storage 154 for storage and maintenance of the stored video frames, (ii) processor 152 so that processor 152 may analyze the received frames and create analytical data pertaining to the received video frames, and/or (iii) video output interface 160 so that the video frames may be viewed at display 168.

Video input interface 156 may comprise a wired interface that connects to one or more of video cameras 170, 172, 174, 176 via a wired bus 178, such as a Universal Serial Bus (USB) arranged according to USB Specification 2.0 by USB Implementers Forum, Inc. Alternatively, or additionally, video input interface 156 may comprise a wireless interface that communicates with one or more of video cameras 170, 172, 174, 176 via an air interface, such as an air interface that carries video frame data on a 2.4 GHz frequency signal.

Video output interface 160 receives video frames from data storage 154, processor 152, and/or video input interface 156, and transmits the received video frames to display 168 via a video cable 180. The video frames transmitted over video cable 180 may comprise RGB video signals (i.e., a Red signal, a Green signal, and a Blue signal), an S-video signal, a digital video signal, or another type of video signal. Alternatively, video output interface 160 may transmit video frames to display 168 via an air interface.

Processor 152 may comprise one or more general purpose processors (e.g., INTEL microprocessors) and/or one or more special purpose processors (e.g., digital signal processors, graphic processing units (GPUs), or cell processors). Processor 152 may execute computer-readable program instructions 182, such as the program instructions executable to carry out any function or any combination of functions described in this description.

As an example, processor 152 may execute program instruction that cause data storage 154 to store at particular data addresses of data storage 154 the video frames received at video input interface 156.

As another example, processor 152 may execute program instructions to detect one or more video objects in a video frame of the received video frames. Processor 152 may detect each video object by detecting the video object was in motion at the time the video frame including the video object was captured or by another means known to a person having ordinary skill in the art.

As yet another example, processor 152 may execute program instructions to analyze each video object so as to generate analytical data corresponding to each video object and to cause data storage 154 to store the analytical data.

As still yet another example, processor 152 may execute program instructions that cause a graphical user interface (GUI) to be displayed at the display 168. Details pertaining to the GUI are described below with respect to FIGS. 4, 5, and 6. Other examples of program instruction executable by processor 152 are also possible.

Data storage 154 comprises a computer readable medium. A computer readable medium may comprise volatile and/or non-volatile storage components, such as optical, magnetic, organic or other memory or disc storage, which can be integrated in whole or in part with processor 152. Alternatively, the entire computer readable medium may be remote from processor 152 and coupled to processor 152 via system bus 162.

Data storage 154 may store various types of data. For example, data storage 154 may store the program instructions 182 executable by processor 152. As another example, data storage 154 may store a plurality of video frames 184 and analytical data 186 corresponding to video objects contained within the plurality of video frames 184. The plurality of video frames 184 may comprise digital data representing the plurality of video frames. The digital data representing the plurality of video frames may be arranged as any of a variety of media files, format, or compression. Other examples of data storable at data storage 154 are also possible.

FIG. 2 depicts a set of exemplary data 200 that may be stored at data storage 154 along with other data described in this description. As shown in FIG. 2, the set of data 200 contains a first subset of data 202 corresponding to video frames (VF) captured by video camera (VC) 170, a second subset of data 204 corresponding to video frames captured by video camera 172, a third subset of data 206 corresponding to video frames captured by video camera 174, and a fourth subset of data 208 corresponding to video frames captured by video camera 176. The data corresponding to video frames captured by a given video camera may include identifiers of the video frames captured by the given video camera. The plurality of video frames 184 may comprise the video frames identified in FIG. 2.

For simplicity of FIG. 2, the subsets of data 202, 204, 206, 208 are shown as including data corresponding to sixteen (16) video frames. However, in carrying out the invention, for each of a plurality of video cameras (e.g., video cameras 170, 172, 174, 176), data storage 154 may contain data corresponding to any quantity of video frames video frames. For instance, for video camera 172, data storage 154 may contain data corresponding to ten thousand (10,000) video frames captured by each of video cameras 170, 172, 174, 176. The data corresponding to the ten thousand (10,000) video frames for each video camera may include the ten thousand (10,000) video frames.

Additionally, although FIG. 2 depicts an identical quantity of video frames captured by video cameras 170, 172, 174, 176 (i.e., sixteen video frames), alternatively, two or more of video cameras 170, 172, 174, 176 may capture a quantity of video frames different from a quantity of video frames captured by the other video camera(s).

Each video frame captured by a video camera may be assigned a unique video frame number. As shown in FIG. 2, the video frames captured by video camera 170 are assigned video frame numbers comprising a whole number within the range of 1,000 to 1,015. For purposes of this description, each captured video frame is assigned the next greater video frame number than the video frame number assigned to the previously captured video frame. Alternatively, or additionally, the video frames numbers assigned to video frames may comprise a timestamp indicating when each video frame was captured.

Each video frame identified in the set of data 200 includes at least one video object. Each video object may be assigned a unique video object number. For example, video frame 1,000 comprises one video object, namely video object number 1. As another example, video frame 1,006 comprises seven video objects, namely video objects 9, 10, 11, 31, 32, 33, 34. Although each video frame identified in the set of data 200 includes at least one video object, alternatively, one or more additional video frames storable in data storage 154 may not include any video objects.

Returning to FIG. 1, selection device 166 may comprise any of a variety of selection devices useable to select various items. For example, selection device 166 may comprise a computer mouse that (i) connects to the selection device interface 158 via a serial cable arranged according to an Electronic Industries Alliance (EIA) RS-232 standard or according to the USB 2.0 Standard, or (ii) that interfaces to selection device interface 158 via an air interface.

Selection device interface 158 provides an interface to selection device 166 and provides means for transmitting signals representing a selection entered via selection device 166 to processor 152. As an example, selection device interface 158 may comprise: (i) a network interface card that connects to system bus 162, and (ii) a connector for receiving a serial cable of selection device 166.

Display 168 may comprise any of a variety of displays. For example, display 168 may comprise a cathode ray tube (CRT) display, a liquid crystal display (LCD) display, a plasma flat panel display and/or a display of a portable device such as a handheld device or a laptop computer. Other examples of display 168 are also possible.

In an alternative embodiment, selection device 166 may be integrated, at least in part, with display 168. As an example, selection device 166 and display 168 may be arranged as a touch screen display, such as a resistive touch screen display or a capacitive touch screen display. Other examples of a touch screen display are also possible.

Figure 3:
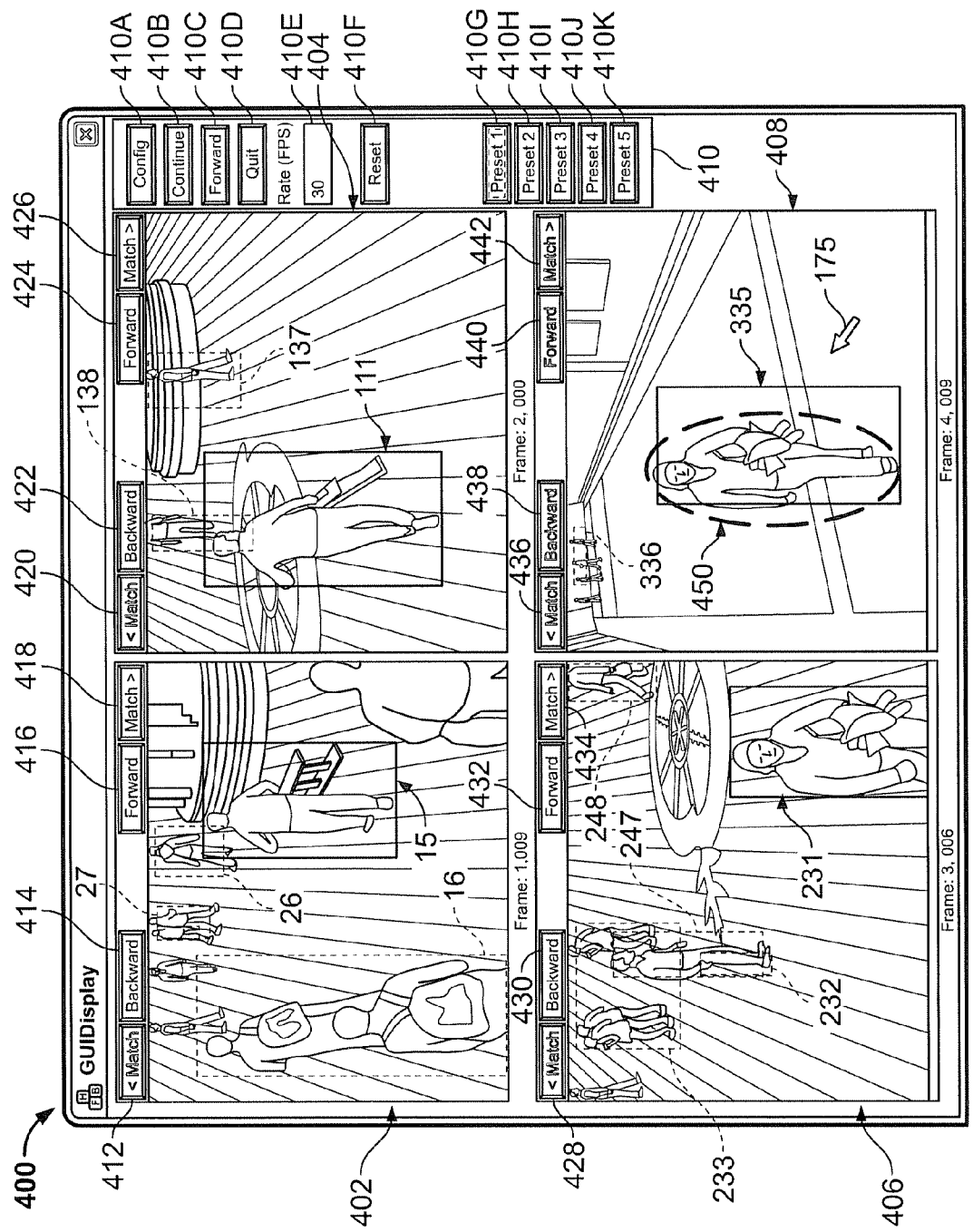
FIGS. 3, 4, and 5 each depict a graphical user interface showing various video frames and video objects in accordance with an exemplary embodiment of the invention.
Figure 4:
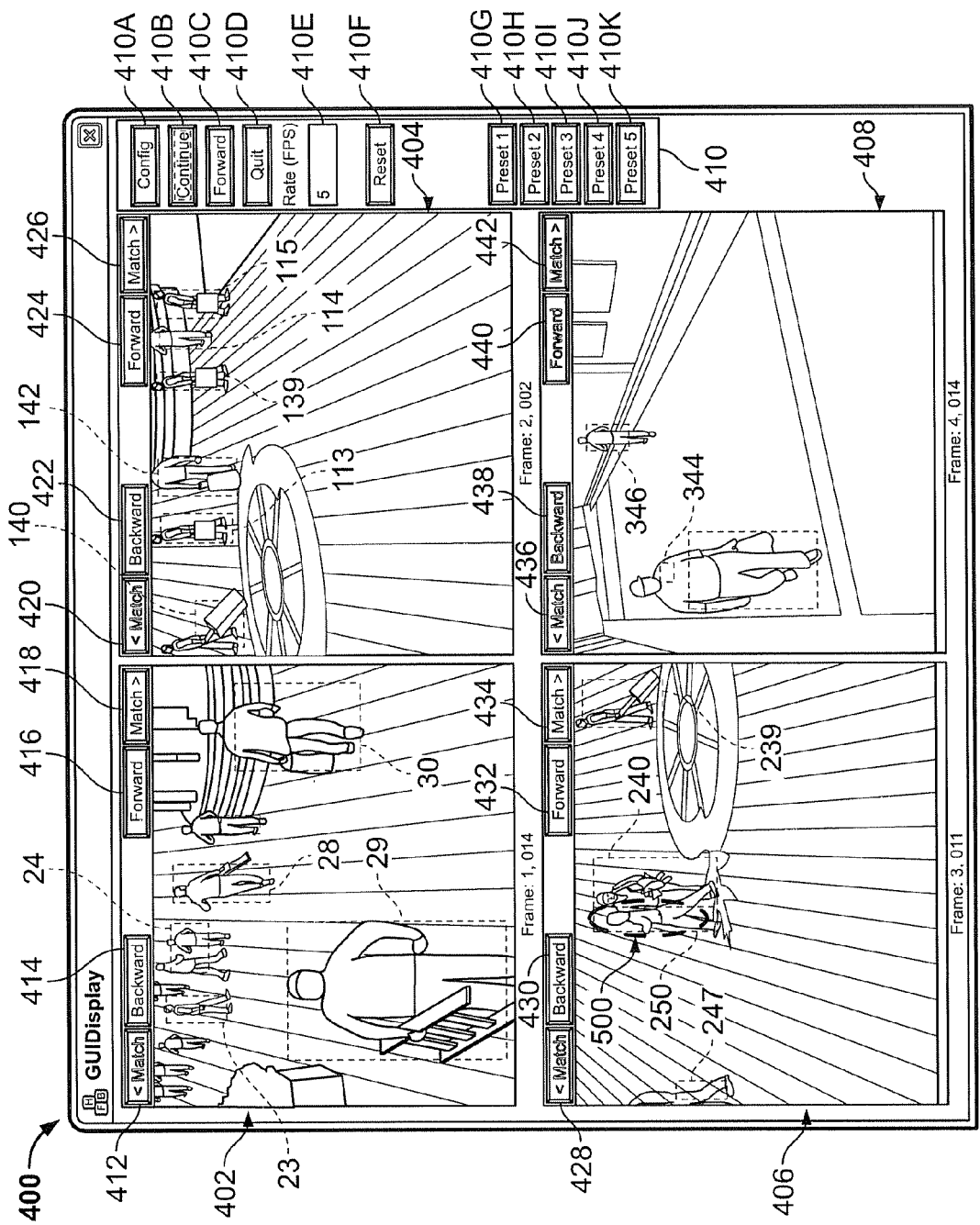
Figure 5:
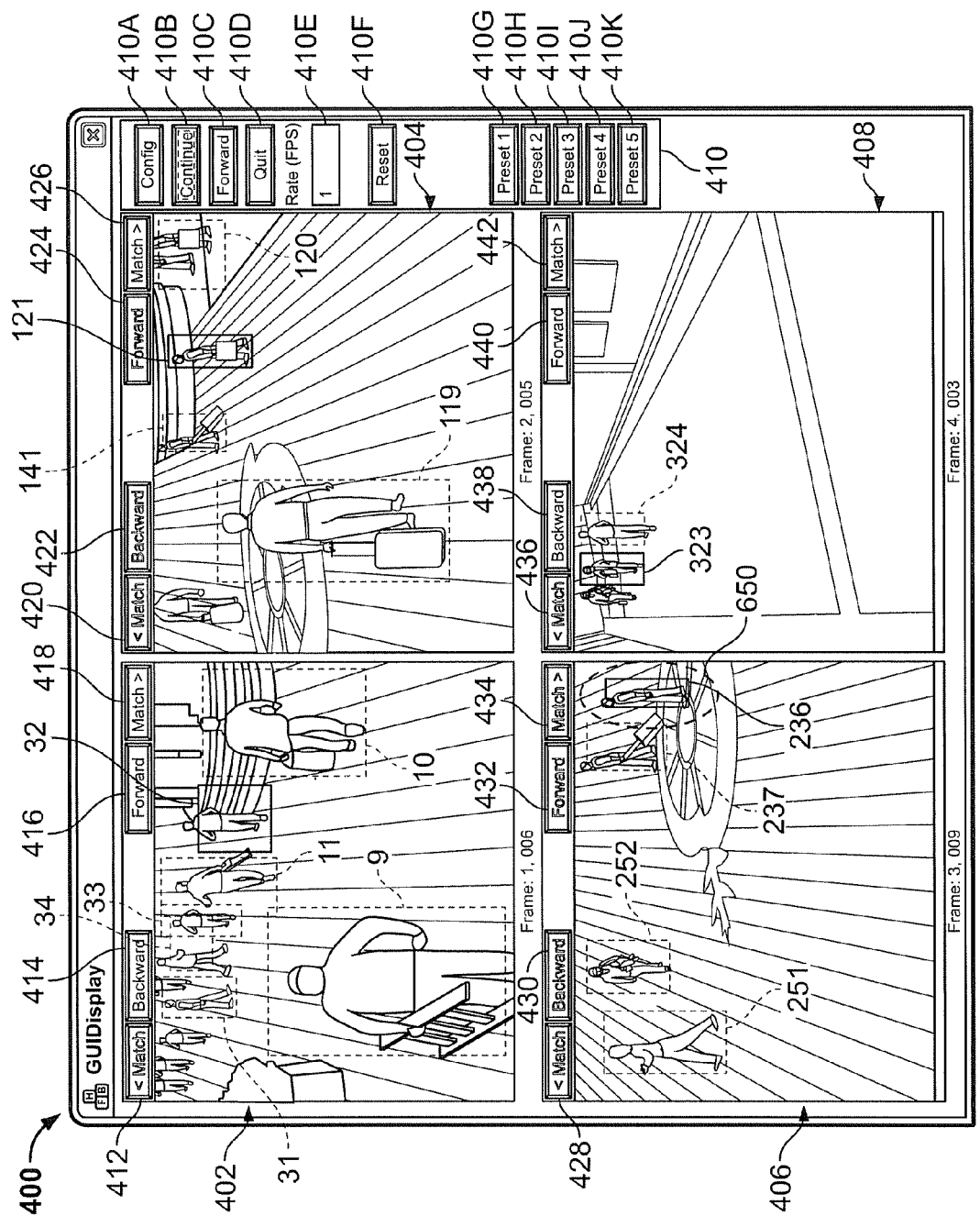

Next, FIGS. 3, 4, and 5 depict an exemplary graphical user interface (GUI) 400 having four video display windows, namely, video display windows 402, 404, 406, 408. GUI 400 may be displayed at display 168. GUI 400 may have a number of video display windows greater than or less than four video display windows. FIGS. 3, 4, and 5 also depict GUI controls 410, 412, 414, 416, 418, 420, 422, 424, 426, 428, 430, 432, 434, 436, 438, 440, 442. Details pertaining to the GUI controls are described below.

In one respect, video display windows 402, 404, 406, 408 may each display video frames captured by a respective video camera. For example, video display window 402 may display video frames captured by video camera 170, video display window 404 may display video frames captured by video camera 172, video display window 406 may display video frames captured by video camera 174, and video display window 408 may display video frames captured by video camera 176.

In another respect, two or more of video display windows 402, 404, 406, 408 may display video frames captured by a single video camera. For instance, video display windows 402, 404 may each display video frames captured by video camera 170. In this regard, the video frames displayed at video display window 402 may comprise video frames captured by video camera 170 at a first time or during a first time period and the video frames displayed at video display window 404 may comprise video frames captured by video camera 170 at a second time or during a second time period. In some instances, video display windows 402, 404 may display the same video frame.

In FIGS. 3, 4, and 5, video objects contained in a video frame are identified by a rectangle, and a selected video object in a video frame is identified by an ellipse, such as ellipse 450 shown in FIG. 3. In particular, a video object identified by a solid-line rectangle indicates that video object has been identified as a video object that most closely matches the selected video object, whereas a video object identified by a dashed-line rectangle indicates that video object has not been identified as a video object that most closely matches the selected video object.

The rectangles and ellipses are not part of the video frame captured by a video camera but may be overlaid on the video frame when the video frame is displayed via GUI 400. Other means for indicating the presence of a video object in a video frame may also be used, such as an outline of another shape (e.g., a circle, a polygon, and/or an outline of the video object) and other means for indicating the presence of a selected video object may also be used. The rectangle or other shape may indicate an outer boundary of all the pixels of the video object such that the video object includes all of the pixels within the shape.

In FIG. 3, video frame 1,009 is displayed in video frame window 402, video frame 2,000 is displayed in video frame window 404, video frame 3,006 is displayed in video frame window 406, and video frame 4,009 is displayed in video frame window 408. Video frame 1,009 includes video objects 15, 16, 26, 27. Video frame 2,000 includes video objects 111, 137, 138. Video frame 3,006 includes video objects 231, 232, 233, 247, 248. Video frame 4,009 includes video objects 335, 336. Video object 335 is a selected video object as indicated by ellipse 450. In FIG. 3, video objects 15, 111, 231, and 335 have been identified as video objects most closely matching the selected video object 335 in video frames 1,009, 2,000, 3,006, and 4,009, respectively.

FIG. 4 depicts a second set of video frames being displayed via GUI 400. In particular, video frame 1,014 is displayed in video frame window 402, video frame 2,002 is displayed in video frame window 404, video frame 3,011 is displayed in video frame window 406, and video frame 4,014 is displayed in video frame window 408. In video frame 3,011, video object 250 is a selected video object as indicated by the ellipse 500. FIG. 4 illustrates the GUI 400 prior to execution of a search for video objects that most closely match the selected video object 250. In other words, each video object in FIG. 4 is identified by a dashed line rectangle.

After performing a search for video objects that most closely match the selected video object 250, video frame window 406 may continue to display video frame 3,011 so as to display the selected video object 250, whereas video frame windows 402, 404, 406 may continue to display video frames 1,014, 2,002, and 4,014, respectively, or some other video frame captured by video cameras 170, 172, and 176, respectively. After performing the search for video objects that most closely match the selected video object 250, each video frame displayed at GUI 400 may include a video object identified by a solid line rectangle indicating that video object most closely matches the selected video object 250. Alternatively, if no video objects in video frames captured by a given video camera (e.g., video camera 170) are identified as most closely matching the selected video object, then the video frame window 402 for the given video camera may provide an indication that no video frames were captured by the given video camera. The indication may be a blank video display window, a video frame test pattern, or some other indication.

FIG. 5 depicts a third set of video frames being displayed via GUI 400. In particular, video frame 1,006 is displayed in video frame window 402, video frame 2,005 is displayed in video frame window 404, video frame 3,009 is displayed in video frame window 406, and video frame 4,003 is displayed in video frame window 408. In video frame 3,009, video object 236 is a selected video object as indicated by the ellipse 650. FIG. 5 illustrates the GUI 400 after execution of a search for video objects that most closely match the selected video object 236. Video objects 32, 121, 236, and 323 have been identified as video objects most closely matching the selected video object 236 in video frames 1,006, 2,005, 3,009, and 4,003, respectively.

A given object may appear in a non-contiguous series of video frames captured by a single video camera. For example, if video camera 170 captures video frames for a given area, video camera 170 may capture (i) a first number of video frames when the given object is located within the given area, (ii) then a second number of video frames after the given object has departed the given area, and (ii) then a third number of video frames after the given object has returned to the given area. In accordance with the invention, a search for video frames that include video objects matching the given object may result in identifying video objects from a non-contiguous series of video frames captured by a single video camera.

3. Graphical User Interface (GUI) Controls

FIGS. 3, 4, and 5 depict GUI controls 410, 412, 414, 416, 418, 420, 422, 424, 426, 428, 430, 432, 434, 436, 438, 440, 442 that may be used to control GUI 400. Selection device 166 may be used to select one of the GUI controls so as to cause processor 152 to execute program instructions that cause a GUI control function to be carried out. FIG. 3 depicts a cursor 175 that may be used to select each of the GUI controls.

GUI controls 410 comprise (i) a CONFIG control 410A (ii) a CONTINUE control 410B, (iii) a FORWARD control 410C, (iv) a QUIT control 410D, (v) a RESET control 410F, (vi) a PRESET 1 control 410G, (vi) a PRESET 2 control 410H, (vii) a PRESET 3 control 410I, (viii) a PRESET 4 control 410J, and (x) a PRESET 5 control 410K.

Selection of CONFIG control 410A may cause processor 152 to execute program instructions that cause a GUI configuration screen to be displayed at display 168. The GUI configuration screen may be displayed over at least a portion of video display windows 402, 404, 406, 408. The configuration screen may be used to configure any of a variety of parameters associated with GUI 400, such as a brightness parameter, a color parameter, and/or a position parameter to change a position of GUI 400 within display 168. Other examples of parameters that may be configured via a configuration screen are also possible.

Selection of CONTINUE control 410B may cause processor 152 to execute program instructions that cause video display windows 402, 404, 406, 408 to display video frames captured at the same time or at substantially the same time. For example, if video display windows 402, 404, 406, 408 are displaying video frames 1,002, 2,013, 3,007, 4,011, respectively, and if video frames 1,002, 2,002, 3,002, 4,002 were captured at the same time or substantially the same time, selection of CONTINUE control 410B may cause video display windows 402, 404, 406, 408 to display video frames 1,002, 2,002, 3,002, 4,002, respectively, and to thereafter, display video frames in the order in which the video frames were captured (i.e., a contiguous sequence).

Selection of FORWARD control 410C may cause processor 152 to execute program instructions that cause video display windows 402, 404, 406, 408 to begin (or continue) displaying video frames in a forward direction based on a time that each video frame was captured. For example, if video display window 402 is displaying video frame 1,006 when FORWARD control 410C is selected, video display window 402 will thereafter display video frames 1,007, 1,008, 1,009, 1,010, 1,011, 1,012, 1,013, 1,014, 1,015 and then any other video frames captured by video camera 170 in an order in which the other video frames were captured. Video display windows 404, 406, 408 will similarly begin displaying video frames in an order of capture starting at the video frame currently being displayed.

Selection of QUIT control 410D may cause processor 152 to execute program instructions that cause GUI 400 to close/exit such that display 168 no longer displays GUI 400 until such time that processor 152 executes program instructions that open GUI 400.

Selection of RESET control 410F may cause processor 152 to execute program instructions that cause previous search results to be deleted or that allow previous search results to be overwritten with new data. For example, these program instructions may cause a first list identifying video objects that most closely match selected video object 335 and a second list that indicates a set of video frames to be displayed to be deleted. After pressing RESET control 410F and prior to searching analytical data again, GUI controls 412, 418, 420, 426, 428, 434, 436, 442, which are described below, may be disabled.

PRESET 1 control 410G, PRESET 2 control 410H, PRESET 3 control 410I, PRESET 4 control 410K, and PRESET 5 control 410L may each be associated with previous searches carried out for a given selected video object. For example, PRESET 1 control 410G may be associated with searches carried out for selected video object 335. In this way, when another video object, such as video object 11, is the most recently selected video object, selection of PRESET 1 control 410G may cause processor 152 to execute program instructions that cause video display windows to display video frames that include video objects most closely matching selected video object 335. Similarly, PRESET 2 control 410H may be associated with searches carried out for selected video object 250, and PRESET 3 control 410I may be associated with searches carried out for selected video object 236. Selection of PRESET 2 control 410H may cause processor 152 to execute program instructions that cause the video display windows to display video frames that include video objects most closely matching selected video object 250 and selection of PRESET 3 control 410K may cause processor 152 to execute program instructions that cause video display windows to display video frames that include video objects most closely matching selected video object 236.

GUI control 410 also comprises a frame rate display 410E for displaying a frame rate of the video frames being displayed in the video display windows. As shown in FIG. 2, the frame rate is 30 frames per second. GUI control 410 could include another control (not shown) for changing the frame rate to a frame rate other than 30 frames per second. In an alternative embodiment, GUI control 410 may comprise a plurality of frame rate displays, such as a distinct frame rate display for each of the video display windows 402, 404, 406, 408.

GUI controls 412, 420, 428, 436 each comprise a PREVIOUS MATCH control ("<Match") for video display windows 402, 404, 406, 408, respectively. Selection of GUI control 412 may cause processor 152 to execute program instructions that cause video display window 402 to display a video frame that was captured by video camera 170 and that includes a video object that is a better match to a selected video object than a video object in a video frame displayed at video display window 402 when GUI control 412 is selected. GUI controls 420, 428, 436 provide similar control of video display windows 404, 406, 408, respectively.

GUI controls 414, 422, 430, 438 each comprise a BACKWARD control for video display windows 402, 404, 406, 408, respectively. Selection of GUI control 414 may cause processor 152 to execute program instructions that cause video display window 402 to display a video frame that was captured by video camera 170 at a time closest to and prior to a time when video camera 170 captured the video frame being displayed when the GUI control 414 is selected. If video display window 402 is displaying the earliest captured video frame stored in data storage 154 for video camera 170, GUI control 414 may be disabled since no earlier captured video frame captured by video camera 170 is available for display. GUI controls 422, 430, 438 may cause similar functions to be carried out for video display windows 404, 406, 408, respectively.

GUI controls 416, 424, 432, 440 each comprise a NEXT MATCH control (">Match") for video display windows 402, 404, 406, 408, respectively. Selection of GUI control 416 may cause processor 152 to execute program instructions that cause video display window 402 to display a video frame that was captured by video camera 170 and that includes a video object that is a next best match to a selected video object as compared to a video object in a video frame displayed at video display window 402 when GUI control 416 is selected.

GUI controls 424, 432, 440 provide similar control of video display windows 404, 406, 408, respectively.

GUI controls 418, 426, 434, 442 each comprise a FORWARD control for video display windows 402, 404, 406, 408, respectively. Selection of GUI control 418 may cause processor 152 to execute program instructions that cause video display window 402 to display a video frame that was captured by video camera 170 at a time closest to and after a time when video camera 170 captured the video frame being displayed when the GUI control 418 is selected. If video display window 402 is displaying the latest captured video frame stored in data storage 154 for video camera 170, GUI control 418 may be disabled since no later captured video frame captured by video camera 170 is available for display. GUI controls 426, 434, 442 may cause similar functions to be carried out for video display windows 404, 406, 408, respectively.

4. Exemplary Operation

Figure 6:
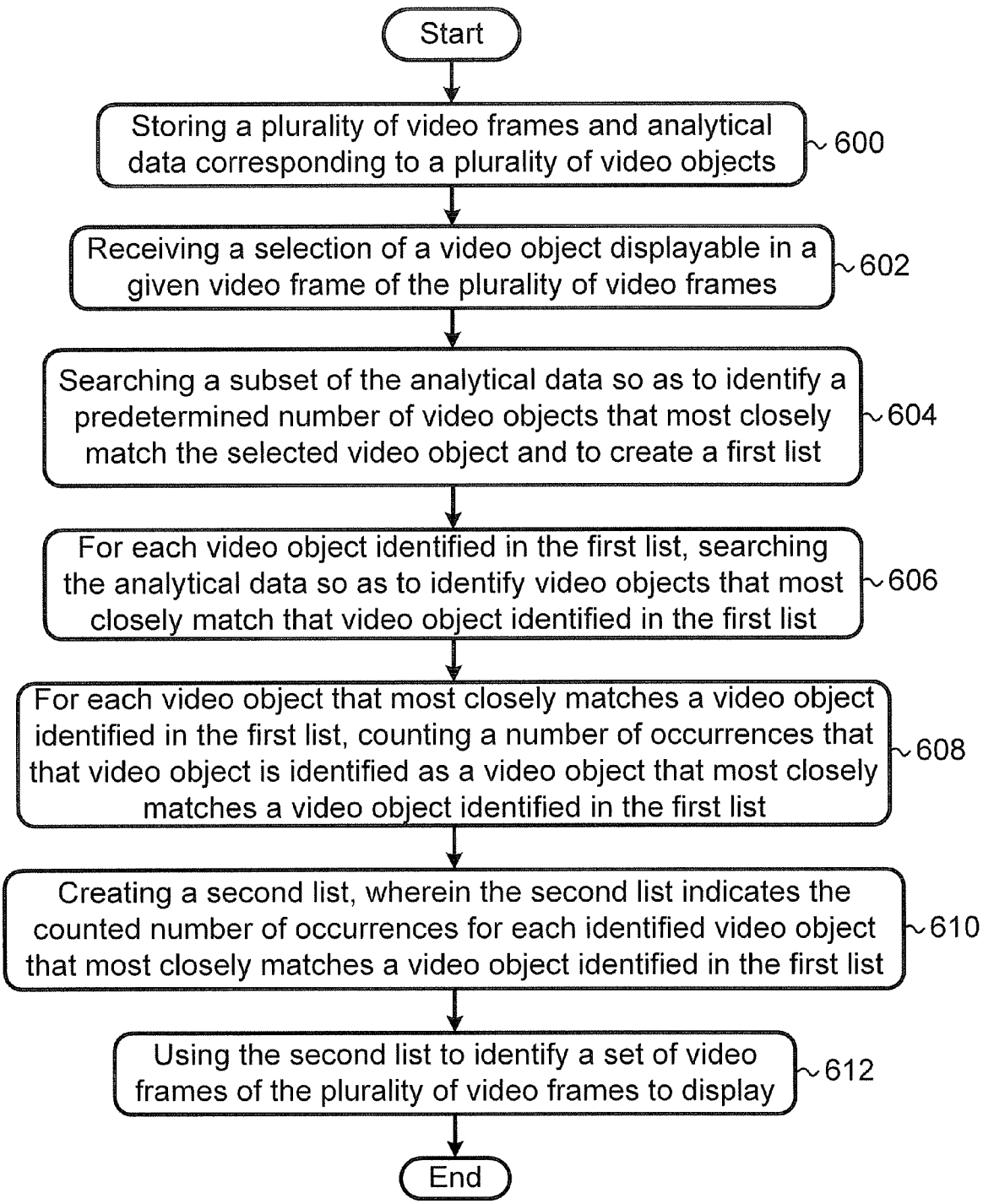
FIG. 6 is a flow chart depicting a set of functions that can be carried out in accordance with an exemplary embodiment of the invention.

FIG. 6 is a flow chart provided to illustrate a set of functions that may be carried out according to an exemplary embodiment of the present invention. For purposes of this description, the video frames and video objects identified in FIG. 2 are used to explain the functions of FIG. 6. One of ordinary skill in the art will realize, however, that the functions shown in FIG. 6 may be carried out for a quantity of video objects greater than the quantity of video objects shown in FIG. 2 and/or for a quantity of video frames greater than the quantity of video frames shown in FIG. 2.

As shown in FIG. 6, block 600 includes storing a plurality of video frames 184 and analytical data 186 corresponding to a plurality of video objects. Each video object of the plurality of video objects is displayable by displaying a video frame of the plurality of video frames 184 that comprises that video object. The analytical data 186 may comprise data that can be compared to determine how closely two video objects match.

The plurality of video objects corresponding to the analytical data 186 includes video objects contained within the stored video frames. For each of the stored video frames, processor 152 may execute program instructions to: (i) detect whether the video frame contains a video object, (ii) generate analytical data for each detected video object, and (iii) cause data storage 154 to store the analytical data 186.

The program instructions to detect whether a video frame contains a video object may comprise program instructions to carry out any method now known or later developed to detect a video object within a video frame. Similarly, the program instructions to generate the analytical data for each detected video object may comprise program instructions to carry out any method now known or later developed to generate the analytical data 186.

Generating the analytical data may be carried out in various ways. For instance, generating the analytical data may be carried out by segmenting video objects within a video frame and then representing features of each segmented video object. As an example, the feature representation may be color appearance information, that is, the analytical data 186 may comprise color data based on the color or colors of a video object. The analytical data 186 based on the color or colors of a video object may include any of a variety of color data. For example, for any given video object, the color data may include Red Green Blue (RGB) color space data, Hue Saturation Value (HSV) color space data, YCrCb color space data, and/or YUV color space data.

As another example, the analytical data 186 may comprise data based on pixel intensity, data indicating which pixels are part of the video object, a unique identifier of the video object, and/or structural information associated with the video object. The structural information may include information pertaining to edges, curvature, and/or texture of the video object, for example. The structural information may include information that indicates how close a structure of the video object matches a circle, rectangle, star, or some other arbitrary shape.

The analytical data 186 may also comprise confidence measures of the other types of data in the analytic data 186. The confidence measures may indicate a determination of how likely a video object is a given type of object, such as a vehicle, person, animal, bag, or some other type of object. The analytical data 186 may comprise a covariance matrix as described hereinafter.

In one respect, processor 152 may analyze the video frames to generate the analytical data 186 after the plurality of video frames 184 are stored at data storage 154, and thereafter, cause data storage 154 to store the analytical data 186. In another respect, processor 152 may cause data storage 154 to store the plurality of video frames 184 and the analytical data 186 at the same time or substantially the same time. For instance, video input interface 156 may receive the plurality of video frames 184, processor 152 may analyze the plurality of video frames 184 so as to generate the analytical data 186, and thereafter, the plurality of video frames 184 and the analytical data 186 may be stored at data storage 154.

Next, block 602 includes receiving a selection of a video object displayable in a given video frame of the plurality of video frames 186. Selection device interface 158 may receive the selection from selection device 166 and thereafter provide the selection to processor 152. Selection device 166 may be used to select the video object. As an example, selection device 166 may be used to move the cursor 175 over video object 335 in video display window 208 and to select video object 335 by clicking a button of selection device 166 (e.g., clicking a button of a computer mouse).

Video display window 208 may be operating in any of a variety of modes when selection device 166 selects video object 335. As an example, video display window 208 may be operating in a mode in which video display window 208 is automatically changing the video frames being displayed at a frame rate greater than 0 frames per second. The video frames may be displayed in a forward direction (or a backward direction) based on a time when each video frame was captured. After selection of video object 335, video display window 208 may enter a pause mode in which video display window 208 displays one video frame (e.g., the video frame 4,009 which contains the selected video object 335) and does not automatically change to display another video frame. Processor 152 may cause video display window 208 to enter pause mode in response to receiving the selection. As another example, video display window 208 may be operating in a pause mode (displaying video frame 4,009) when selection device 166 selects video object 335.

Next, block 604 includes searching a subset of the analytical data so as to identify a number of video objects that most closely match the selected video object 335 and to create a first list. The first list may identify the number of video objects that most closely match the selected video object 335. The first list may include the selected video object 335, but does not have to include the selected video object. The search carried out at block 604 is a "seed search."

As indicated above, the subset of analytical data may comprise analytical data for which there is a high probability that the analytical data will correspond to video objects that most closely match the selected video object 335. In particular, the subset of analytical data may comprise analytical data corresponding to video frames having the highest probability of comprising video objects that most closely match the selected video object 335.

Any of a variety of methods may be used to determine the video frames having the highest probability of comprising video objects that most closely match the selected video object 335. For purposes of this description, these video frames will be referred to as "the highest probability video frames." The highest probability video frames may comprise a number of video frames captured by the video camera 226 that captured the given video frame 4,009 including the selected video object 335. In this regard, the video frames captured by video camera 226 may comprise: (i) a first number of video frames captured by video camera 226 immediately before capturing video frame 4,009, (ii) a second number of video frames captured by video camera 226 immediately after capturing video frame 4,009, or (iii) a combination of these video frames. The highest probability video frames captured before or after capture of the given video frame 4,009 may have been captured during a contiguous period of time. The highest probability video frames may comprise the video frame 4,009 including the selected video object 335.

The subset of analytical data may comprise analytical data corresponding to video objects within the first number of data frames and/or analytical data corresponding to video objects within the second number of video frames. The first number of video frames and the second number of video frames may be the same number or different numbers. The first number of video frames or the second number of video frames may be zero. The first number of video frames and second number of video frames may be selected by selection device 166 or preprogrammed by a manufacturer of program instructions that generate GUI 400.

As an example, the subset of analytical data may comprise analytical data corresponding to video objects contained in three video frames captured immediately before capture of video frame 4,009 (i.e., video frames 4,006, 4,007, 4,008) and three video frames captured immediately after capture of video frame 4,009 (i.e., video frames 4,010, 4,011, 4,012). One of ordinary skill in the art will realize that the subset of analytical data may comprise data corresponding to a number of video objects greater than 6 video frames, such as 1,000, 2000, or another number of video frames.

Processor 152 may execute program instructions that cause processor 152 to compare the subset of analytical data to analytical data corresponding to the selected video object 335. In response to comparing the data, processor 152 may create the first list that identifies one or more video objects that most closely match selected video object 335. The identified video objects that most closely match the selected video object may include video objects that substantially identically match the selected video object and/or that have one or more characteristics (e.g., a color, texture, structural information, etc.) substantially similar to characteristics of the selected video object. Processor 152 may execute program instructions that cause data storage 154 to store the first list.

As an example, the first list may identify video objects 329, 333, 334, 337, 338, 341. Additionally, the first list may identify the selected video object 335. Other examples of the first list created in response to searching the subset of analytical data are also possible.

Next, block 606 includes for each video object identified in the first list, searching the analytical data 186 so as to identify video objects that most closely match that video object identified in the first list. The search carried out at block 606 is a "complete search" of analytical data 186 for each video object identified in the first list. Each complete search may include searching the analytical data 186 corresponding to all video frames stored at data storage 154 (e.g., video frames 1,000 to 1,015, 2,000 to 2,015, 3,000 to 3,015 and 4,000 to 4,015).

In accordance with the example in which the first list identifies video objects 329, 333, 334, 337, 338, 341, the search of the analytical data 186 may involve: (i) a first search to compare the analytical data corresponding to video object 329 to the analytical data corresponding to each video object contained in a video frame stored at data storage 154 so as to identify video objects that most closely match video object 329, (ii) a second search to compare the analytical data corresponding to video object 333 to the analytical data corresponding to each video object contained in a video frame stored at data storage 154 so as to identify video objects that most closely match video object 333, (iii) a third search to compare the analytical data corresponding to video object 334 to the analytical data corresponding to each video object contained in a video frame stored at data storage 154 so as to identify video objects that most closely match video object 334, (iv) a fourth search to compare the analytical data corresponding to video object 337 to the analytical data corresponding to each video object contained in a video frame stored at data storage 154 so as to identify video objects that most closely match video object 337, (v) a fifth search to compare the analytical data corresponding to video object 338 to the analytical data corresponding to each video object contained in a video frame stored at data storage 154 so as to identify video objects that most closely match video object 338, and (vi) a sixth search to compare the analytical data corresponding to video object 341 to the analytical data corresponding to each video object contained in a video frame stored at data storage 154 so as to identify video objects that most closely match video object 341. Two or more of these searches may be carried out sequentially and/or two or more of these searches may be carried out concurrently.

Additionally, a seventh search may be carried out to compare the analytical data corresponding to video object 335 to the analytical data corresponding to each video object contained in a video frame stored at data storage 154 so as to identify video objects that most closely match video object 335.

Table 1 indicates the exemplary first list including selected video object 335 and an exemplary list of video objects identified during the first search through the seventh search described above.

TABLE 1

| First List | Video objects identified during the first search through the seventh search |
|---|---|
| 329 | 15, 18, 221, 240, 333, 335 |
| 333 | 15, 29, 118, 241, 334, 335 |
| 334 | 29, 221, 240, 241, 335 |
| 335 | 9, 15, 29, 111, 118, 119, 221, 231, 240, 323, 329, 333, 334, 337, 338, 341, 343 |
| 337 | 15, 18, 111, 334, 335, 338 |
| 338 | 15, 111, 118, 240, 334, 335, 337 |
| 341 | 30, 111, 112, 229, 234, 241, 335, 343 |

Next, block 608 includes for each video object that most closely matches a video object identified in the first list, counting a number of occurrences that that video object is identified as a video object that most closely matches a video object identified in the first list.

Processor 152 may execute program instructions for counting the number of occurrences. Based on the data shown in Table 1, the number of occurrences for each video object of the video objects identified during the first search through the seventh search are as follows in the form "video object number (number of occurrences/video frame number):" 9 (1/1, 006), 15 (5/1,009), 18 (2/1,011), 29 (3/1,014), 30 (1/1,014), 111 (4/2,000), 112 (1/2,001), 118 (3/2,004), 119 (1/2,005), 221 (3/3,000), 229 (1/3,005), 231 (1/3,006), 234 (1/3,007), 240 (4/3,011), 241 (3/3,012), 323 (1/4,003), 329 (1/4,006), 333 (2/4,007), 334 (4/4,008), 335 (6/4,009), 337 (2/4,010), 338 (2/4,011), 341 (1/4,012), 343 (2/4,014).

Next, block 610 includes creating a second list. The second list may indicate the counted number of occurrences for each identified video object that most closely matches a video object identified in the first list. The second list may be stored at data storage 154. The second list may list the video objects in any of a variety of orders. For example, the second list may list the video objects in an order from most occurrences to least occurrences (e.g., 335 (6/4,009), 15 (5/1,009), 111 (4/2,000), 240 (4/3,011), 334 (4/4,008), 29 (3/1,014), 118 (3/2,004), 221 (3/3,000), 241 (3/3,012), 18 (2/1,011), 333 (2/4,007), 337 (2/4,010), 338 (2/4,011), 343 (2/4,014), 9 (1/1,006), (1/1,014), 112 (1/2,001), 119 (1/2,005), 229 (1/3,005), 231 (1/3,006), 234 (1/3,007), 323 (1/4,003), 329 (1/4,006), 341 (1/4,012)). As another example, the second list may list the video objects in order from most occurrences to least occurrences for each video camera (in an order of video cameras 170, 172, 174 and 176) (e.g., 15 (5/1,009), 29 (3/1,014), 18 (2/1,011), 9 (1/1,006), (1/1,014), 111 (4/2,000), 118 (3/2,004), 112 (1/2,001), 119 (1/2,005), 240 (4/3,011), 221 (3/3,000), 241 (3/3,012), 229 (1/3,005), 231 (1/3,006), 234 (1/3,007), 335 (6/4,009), 334 (4/4,008), 333 (2/4,007), 337 (2/4,010), 338 (2/4,011), 343 (2/4,014), 323 (1/4,003), 329 (1/4,006), 341 (1/4,012)). Other examples of the second list are also possible.

Next, block 612 includes using the second list to identify a set of video frames of the plurality of video frames to display. Processor 152 may execute program instructions to determine from the second list the set of video frames to display.

As an example, processor 152 may determine that the set of video frames to display includes a given percentage (e.g., 25%) of the video objects in the second list based on the number of occurrences. In this regard, the set of video frames may comprise the 6 video frames including the video objects having the most occurrences (e.g., video frames 4,009, 1,009, 2,000, 3,011, 4,008, 1,014). In case of a tie, such as video frames 1,014, 2,004, 3,000, 3,012 each being identified three times as including a video object most closely matching a video object in the first list, processor 152 may make a determination which of the video frames having the same number of occurrences include a video object that is the best match to the video object in the list, and include that video frame or video frames in the set of video frames to reach the given percentage of video frames.

As another example, processor 152 may determine that the set of video frames to display includes a number of video frames. For example, the number of video frames may comprise 50 video frames. If the second list identifies less than 50 video frames or 50 video frames, then the set of video frames includes all of the video frames identified by the second list. If the second list identifies greater than 50 video frames, then processor 152 may determine the 50 video frames including video objects having the greatest number of occurrences.

After identifying the set of video frames to display, GUI 400 may display the set of video frames. In particular, video display window 402 may display video frames within the set of video frames that were captured by video camera 170, video display window 404 may display video frames within the set of video frames that were captured by video camera 172, video display window 406 may display video frames within the set of video frames that were captured by video camera 174, and video display window 408 may display one or more video frames within the set of video frames that were captured by video camera 176. If a video camera did not capture any of the video frames in the set of video frames, the video display window corresponding to that video camera may display a test pattern video frame (e.g., a solid blue screen), a previously displayed video frame, or some other video frame.

Additionally, while any of the video frames of the set of video frames are being displayed or some other video frames are being displayed, one or more of blocks 600 through 612 may be repeated for another selected video object. Repeating one or more of blocks 600 through 612 may be carried out as many times as a user desires.

Figure 7:
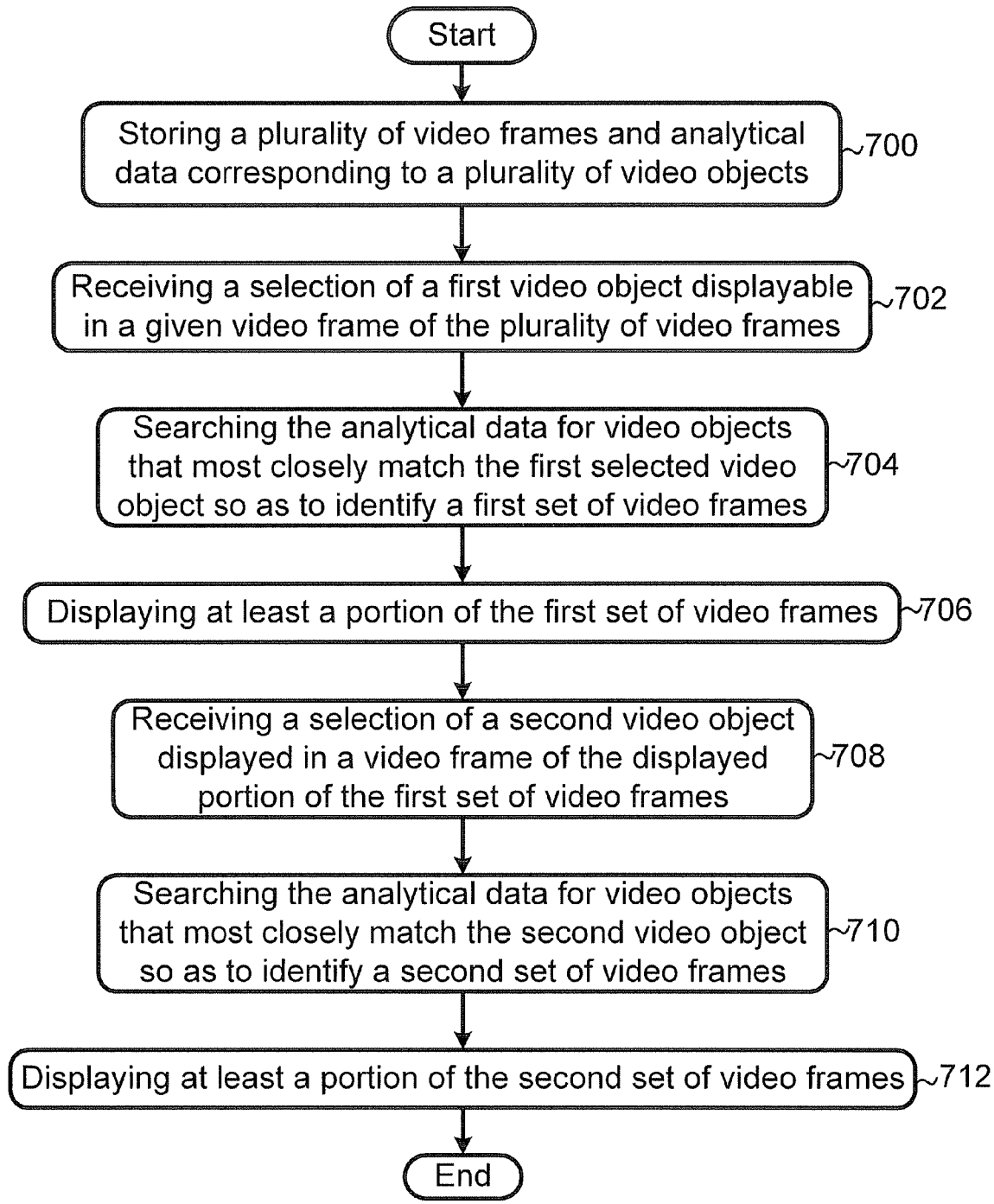
FIG. 7 is a flow chart depicting another set of functions that can be carried out in accordance with an exemplary embodiment of the invention.

FIG. 7 is a flow chart provided to illustrate another set of functions that may be carried out according to an exemplary embodiment of the present invention. For purposes of this description, the video frames and video objects identified in FIG. 2 are used to explain the functions of FIG. 7. One of ordinary skill in the art will realize, however, that the functions shown in FIG. 7 may be carried out for a quantity of video objects greater than the quantity of video objects shown in FIG. 2 and/or for a quantity of video frames greater than the quantity of video frames shown in FIG. 2.

As shown in FIG. 7, block 700 includes storing a plurality of video frames and analytical data corresponding to a plurality of video objects. Each video object of the plurality of video objects is displayable by displaying a video frame of the plurality of video frames that comprises that video object. The function of block 700 may be carried out as described above with respect to the function of block 600.

Next, block 702 includes receiving a selection of a first video object displayable in a given video frame of the plurality of video frames. The function of block 702 may be carried out as described above with respect to the function of block 602. By way of example, the selected video object for block 702 may be video object 335, which is displayable in video frame 4,009.

Next, block 704 includes searching the analytical data for video objects that most closely match the first selected video object 335 so as to identify a first set of video frames. Searching the analytical data may comprise processor 152 executing program instructions that cause processor 152 to compare analytical data corresponding to video object 335 to the analytical data corresponding to each video object displayable in a video frame stored at data storage 154. In this regard, processor 152 performs a complete search of the analytical data.

The search carried out at block 704 for selected video object 335 may be identical to the seventh search carried out for video object 335, as described above with respect to block 606. Processor 152 may identify video objects 9, 15, 29, 111, 118, 119, 221, 231, 240, 323, 329, 333, 334, 337, 338, 341, 343 as the video objects that most closely match selected video object 335. In this regard, the first set of video frames includes video frames 1,006, 1,009, 1,014, 2,000, 2,004, 2,005, 3,000, 3,006, 3,011, 4,003, 4,006, 4,007, 4,008, 4,010, 4,011, 4,012, 4,014. Each of these video frames includes one of the video objects of the first set of video frames. Alternatively, one or more video frames of the first set of video frames may include multiple video objects that are identified during the search of the analytical data for video objects that most closely match the first selected video object 335. The first set of video frames may include the video frame (e.g., video frame 4,009) including the selected video object.

Additionally, a list of the video objects of the first set and/or video frames including the video objects of the first set may be generated. The list may identify the video objects and/or video frames in an order according to how closely each video object matches the selected video object 335. For example, the list may identify the video objects (and the video frames in parenthesis) in the following order: 333 (4,007), 334 (4,008), 337 (4,010), 118 (2,004), 9 (1,006), 338 (4,011), 231 (3,006), 221 (3,000), 343 (4,014), 29 (1,014), 240 (3,011), 15 (1,009), 329 (4,006), 323 (4,003), 119 (2,005), 111 (2,000), 341 (4,012). Each of the multiple lists identify the video frames in an order according to how closely each video object matches the selected video object 335.

Alternatively, the list may comprise multiples lists, where each of the multiple lists identifies video objects captured on video frames by a respective video camera. For example, a first list based on video objects of the first set captured by video camera 170 may identify the identified video objects as 9 (1,006), 29 (1,014), 15 (1,009), a second list based on video objects of the first set captured by video camera 172 may identify the identified video objects as 118 (2,004), 119 (2,005), 111 (2,000), a third list based on video objects of the first set captured by video camera 174 may identify the identified video objects as 231 (3,006), 221 (3,000), 240 (3,011), and a fourth list based on video objects of the first set captured by video camera 176 may identify the identified video objects as 333 (4,007), 334 (4,008), 337 (4,010), 338 (4,011), 329 (4,006), 323 (4,003), 341 (4,012).

Next, block 706 includes displaying at least a portion of the first set of video frames. Displaying the at least a portion of the first set of video frames may be carried out in any of a variety of ways.

As an example, the at least a portion of the set of identified video frames may be displayed in an order according to how closely each video object matches the selected video object 335. For example, video display windows 402, 404, 406 may each display a video frame captured by video cameras 170, 172, 174, respectively, that includes the video object (captured by that video camera) ranked as most closely matching the selected video object 335, and video display window 408 may display video frame 4,009 including selected video object 335. For instance, video display windows 402, 404, 406 may display video frames 1,006, 2,004, and 3,006 respectively.

In one respect, while displaying video frame 1,006, GUI control 418 ("MATCH>") may be selected to cause video display window 402 to display the video frame (e.g. video frame 1,014) including the next best matching video object (e.g., video object 29) captured in a video frame by video camera 170, and then GUI control 418 may be selected again to cause video display window 402 to display the video frame (e.g. video frame 1,014) including the next best matching video object (e.g., video object 29) captured in a video frame by video camera 170. In this way, video display window 402 can display video frames in an order based on how close a video object in the video frame matches the selected video object as compared to displaying video frames in an order in the video frames were captured. Video display windows 404, 406, 408 may function similarly to display video frames captured by video cameras 172, 174, 176, respectively, when GUI controls 426, 434, 442, respectively, are selected.

In another respect, while displaying video frame 1,006, GUI control 416 ("FORWARD") may be selected to cause video display window 402 to begin displaying video frames captured by video camera 170 in the order that video camera 170 captured the video frames (i.e., video frames 1,007, 1,008, 1,009 . . . 1,015) after capturing video frame 1,006. In this way, video display window 402 may begin displaying video frames that are not in the set of identified video frames. Video display windows 404, 406, 408 may function similarly to display video frames captured by video cameras 172, 174, 176, respectively, when GUI controls 424, 432, 440, respectively, are selected.

In yet another respect, video display windows 402, 404, 406, 408 may automatically display video frames captured by video cameras 170, 172, 174, 176, respectively, upon processor 152 determining the second set of video frames.

The at least a portion of the set of video frames may be displayed at any of a variety of frames rates. For example, one or more of video display window 402, 404, 406, 408 may display video frames at the frame rate (e.g., 30 frames per second) at which video cameras 170, 172, 174, 176, respectively, captured the video frames. As another example, one or more of video display window 402, 404, 406, 408 may display video frame rate determined by how often a user selects a GUI control.

Next, block 708 includes receiving a selection of a second video object displayed in a video frame of the displayed portion of the first set of video frames. Referring to FIGS. 1 and 4, and by way of example, selection device interface 158 may receive from selection device 166 a selection of video object 250 in video frame 3,011. Selection device interface 158 may provide the selection to processor 152 so as to trigger execution of program instructions in response to receiving the selection.

Video object 250 may be selected because of an interaction between video object 250 and video object 240, which, as shown in FIG. 3, is identified as a video object in video frame 3,011 that most closely matches the first selected video object 335. The interaction that triggers selection of a video object may be any of a variety of interactions. For example, the interaction may comprise video object 250 being within a given distance of video object 240, video object 250 passing in front of or behind video object 240, video object 250 passing on the left side or the right side of video object 240, video object 240 providing an item (e.g., a package) to or receiving the item from video object 250, or some other interaction that may occur between video objects 240, 250. The given distance between video objects 240, 250 may be a distance within the range of 0.0 meters to 4.0 meters, or some other distance. The interaction may be determined by processor 152 or by a user viewing the first set of video frames.

Selection device interface 158 may receive the selection of video object 250 while video display window 406 is operating in a pause mode displaying video frame 3,011, or while video display window 406 is operating in a mode in which video display window 406 periodically changes from one video frame to another video frame without a user having to select a GUI control.

Next, block 710 includes searching the analytical data for video objects that most closely match the second selected video object 240 so as to identify a second set of video frames. Each video frame of the second set of video frames comprises at least one video object identified as being a video frame that includes a video object that most closely matches the second selected video object 240. Searching the analytical data may comprise processor 152 performing a complete search of the analytical data.

The second set of video objects may comprise video objects within video frames captured by one or more of video cameras 170, 172, 174, 176. The second set of video objects may comprise a quantity of video objects equal to a predetermined number. As an example, the predetermined number may be 50 such that the second set of video objects comprises 50 video objects that most closely match the second selected video object 240. As another example, the second set of video objects may comprise a quantity of video objects less than the predetermined number, such as when the plurality of video objects includes less than the predetermined number of video objects that most closely match the second selected video object 240. The second set of video objects may comprise a quantity of video objects greater than, less than, or equal to the quantity of video objects of the first set of video objects.

As an example, processor 152 may identify video objects 2, 12, 32, 121, 124, 238, 242, 243, 245, 246, 247, 251, 323, 325, 329, 335, 339 as the video objects that most closely match selected video object 240. In this regard, processor 152 may identify the second set of video frames to include video frames 1,001, 1,006, 1007, 2,005, 2,007, 3,006, 3,009, 3,010, 3,012, 3,013, 3,014, 3,015, 4,003, 4,004, 4,006, 4,009, 4,011. The second set of video frames may include the video frame that includes the selected video (e.g., video frame 3,011).

Additionally, a list of the second set of video objects and/or video frames including the second set of video objects may be generated. The list may identify the video objects of the second set and/or video frames including video objects in the second set in an order according to how closely each video object matches the second selected video object 240. Alternatively, the list may comprise multiples lists, where each of the multiple lists include the video objects of the second set and captured on video frames by a respective video camera in an order of how closes the video objects match the second selected video object. Each of these multiple lists may include the video frame corresponding to the video objects in that list.

Next, block 712 includes displaying at least a portion of the second set of video frames. Displaying the at least a portion of the second set of video frames may be carried out in any of a variety of ways. The GUI controls of GUI 400 may be used to select which video frames of the second set are displayed.

As an example, the at least a portion of the second set of video frames may be displayed in an order according to how closely each video object matches the selected video object 240. For example, video display windows 402, 404, 408 may each display a video frame captured by video cameras 170, 172, 176, respectively, that includes the video object (captured by that video camera) ranked as most closely matching the selected video object 240, and video display window 406 may display video frame 3,011 including selected video object 240. For instance, video display windows 402, 404, 408 may display video frames 1,001, 2,007, and 4,014 respectively.

In one respect, while displaying video frame 1,001, GUI control 418 ("MATCH>") may be selected to cause video display window 402 to display the video frame (e.g. video frame 1,007) including the next best matching video object (e.g., video object 12) captured in a video frame by video camera 170, and then GUI control 418 may be selected again to cause video display window 402 to display the video frame (e.g. video frame 1,006) including the next best matching video object (e.g., video object 32) captured in a video frame by video camera 170. In this way, video display window 402 can display video frames in an order based on how close a video object in the video frame matches the selected video object. Video display windows 404, 406, 408 may function similarly to display video frames captured by video cameras 172, 174, 176, respectively, when GUI controls 426, 434, 442, respectively, are selected.

In another respect, while displaying video frame 1,001, GUI control 416 ("FORWARD") may be selected to cause video display window 402 to begin displaying video frames captured by video camera 170 in the order that video camera 170 captured the video frames (i.e., video frames 1,002, 1,003, 1,004 . . . 1,015) after capturing video frame 1,001. In this way, video display window 402 may begin displaying video frames that are not in the set of identified video frames. Video display windows 404, 406, 408 may function similarly to display video frames captured by video cameras 172, 174, 176, respectively, when GUI controls 424, 432, 440, respectively, are selected.

The at least a portion of the second set of video frames may be displayed at any of a variety of frames rates. For example, one or more of video display window 402, 404, 406, 408 may display video frames at the frame rate (e.g., 30 frames per second) at which video cameras 170, 172, 174, 176, respectively, captured the video frames. As another example, one or more of video display window 402, 404, 406, 408 may display video frame rate determined by how often a user selects a GUI control.

The functions of receiving a selection of a video object in a video frame of a displayed portion of set of video frames, searching analytical data, and displaying at least a portion of another set of video frames, as in blocks 708, 710, 712, may be performed repeatedly for each video object a user may select in one of the video frames.

5. Video Data Matching Using Clustering on Covariance Appearance

Each video object within a video frame may be associated with an appearance model. Video data matching includes both a single region of data and sequences of region data. In an embodiment, a video processing system selects, from a first matrix row corresponding to a test appearance model, one or more other appearance models as a function of similarity measures populating the first matrix row. After selection of the one or more other appearance models, the system then selects, from other matrix rows corresponding to the one or more other appearance models selected in the first step, one or more additional appearance models as a function of the similarity measures populating the other matrix rows. The system then ranks the appearance models selected from the first matrix row and the other matrix rows.

Embodiments of the invention include features, methods or processes embodied within machine-executable instructions (e.g., program instructions 182) provided by a machine-readable medium (e.g. data storage 154). A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor (e.g., processor 152), programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

In one or more embodiments, a system and method queries for corresponding video data. The video data can be one video frame, or a region within the video frame of data or sequences of video frames, or regions within the video frames for one object. Either the one video frame, or a region within the video frame data and the clusters of data (e.g. tracks, groups of regions sharing similar properties, etc) can be in a multiple camera surveillance system (e.g. system 150). One region within a frame or a blob (region) of data or one track corresponds to another region or blob (region) or another track when the same object or person appears in those frames or clusters (e.g., tracks).

In the present system, an object's trajectory can appear in non-overlapping cameras. For example, for sequence matching, as a first step, multiple targets are tracked in each camera. After tracks for each individual camera are established, a covariance matrix is used as the appearance model for each region within the frame in a track. Agglomerative (or other type of clustering based on similarity) clustering regroups the similar regions within the frame in each track. The number of regions in each cluster is counted, and if the number of regions in a particular cluster is less than a threshold, that cluster is viewed as an outlier and it is not further processed. A calculation is made to determine a representative region for each valid cluster, so that each track is represented by several representative regions. An autocovariance-based appearance model is built for each region representing a particular cluster. The matching of similar tracks (or clusters) is then determined by calculating a Hausdorff distance between a query track (or cluster) and one or more candidate tracks or clusters.

In an embodiment of the system, it is assumed that motion detection and motion is readily available and tracks of individual people and/or objects might also be available (trajectories of objects may be available, but are not required) and are pre-stored. That is, it is a forensic analysis, where the operator (or an automated system) is performing a query (i.e., providing a template or region of interest) to the system, and the regions or tracks are readily available. Video data from a set of cameras (e.g., video cameras 170, 172, 174, 176) is provided to an embodiment of the presently disclosed system, and the system runs all of its processing to associate people and objects in the video across all the cameras and stores the results in a data structure (e.g., data storage 154) designed for quick query. The tracking whenever available provides a spatial-temporal description of detected moving regions in a field of view.

In an embodiment of the system, it is assumed that regions of interest (stationary people, moving people, stationary faces, moving faces, stationary vehicles, moving vehicles, moving regions, etc.) are readily available, and may be augmented with tracking information. That is, it is a forensic analysis, where the operator (or an automated system) is performing a query (i.e., providing a template or region of interest) to the system, and the regions or tracks are readily available. Video data from a set of cameras is provided to an embodiment of the presently disclosed system, and the system runs all of its processing to associate objects in the video data across all the cameras and stores the results in a data structure designed for quick query.

In an embodiment of the system, it is assumed that regions of interest (described above) are computed online (i.e., realtime) and is provided to an embodiment of the presently disclosed system, and the system runs all of its processing to associate objects with past observations in the video data across all the cameras and stores the results in a data structure designed for quick query.

Various embodiments of the disclosed video processing system focus on the query aspect of the system. That is, a user can search a video database by providing examples of the people and/or objects for whom they are looking. This is sometimes referred to as query by example. One use of the system is for determining actions taken before an event. For example, by examining the video data recorded by a security system in a place of business over the course of a week, one can determine the routes taken through a building by a particular person, or develop a list of all people someone interacted with while in a building that particular week.

In an embodiment, a covariance matrix based appearance model is used. Specifically, this covariance matrix appearance model is used to query both within a single camera and with multiple cameras. There are several advantages of the covariance appearance model. First, it can efficiently fuse many heterogeneous features. Second, it does not require motion information of objects and third can handle rigid and non-rigid objects observed by non-stationary cameras. Therefore it is robust to objects' pose and illumination changes which can occur when tracking across different cameras. This is particularly advantageous when the video repository contains video data from non-overlapping cameras, where the views of the different cameras can be different and the appearance of the objects might vary greatly in scale, pose, and shape.

In one particular embodiment of the system, the system performs its query of the video data based on a blob appearance model. In this embodiment, an appearance model for a blob is first defined. Since a goal of such a system is to support un-calibrated non-overlapping cameras, the appearance models have to be robust to changes in color, scale, pose, and other similar appearance factors.

To generate appearance models a covariance matrix based method is used. An advantage of this approach is the ability to fuse heterogeneous types of features, and it has a small dimensionality. Low dimensionality is beneficial when working with a large video repository. The covariance matrix is built over a feature set using the following equation where the feature set is given as $f_k$. The feature set is made up of spatial and appearance attributes.

$$f_k = [x, y, I(x,y), I_x(x,y), I_y(x,y)] \quad (1)$$

And the covariance is defined by $$C = \Sigma (f_k - \mu_R)(f_k - \mu_R)^T \quad (2)$$

The feature set $f_k$ defined above uses image intensity values. Other variations of $f_k$ may also be used such as the use of color images and the corresponding RGB descriptors:

$$f_k = [x, y, R(x,y), R_x(x,y), R_y(x,y), G(x,y), G_x(x,y), G_y(x,y), B(x,y), B_x(x,y), B_y(x,y)]$$

Other color spaces such as Hue-Saturation-Value (HSV), or YCrCb, or YUV and alike could be also considered.

After generating the covariance-based appearance models for every object in the system, the similarity of the models are compared. The distance between two models is given below in equation no. 3:

$$\rho(C_i, C_j) = \sqrt{\sum_{k=1}^{d} \ln^2 \lambda_k(C_i, C_j)} \quad (3)$$

where $C_i$ represents the first model as a covariance matrix and $C_j$ the second model as a covariance matrix. The $\lambda_k(C_i, C_j)$ are the generalized eigenvalues of the appearance models $C_i$ and $C_j$ and can be obtained by solving the equation $\det(C_i - \lambda_k(C_i, C_j))C_j) = 0$. The matching method uses this distance metric to generate a set of matches that may be referred to as M for a queried model m. In an embodiment, the number of matches is determined by a percent of all models in the system, not a specific distance threshold. Using a percentage rather than a distance threshold allows the method to handle a broader set of models since all models are not held to the same similarity measure. This is beneficial since different cameras can have slightly different color values (variable camera gain). So, while setting a threshold might work within one camera very well, across all cameras the threshold may have to be higher to accommodate the difference in color and a consequently larger distance between models of the same object. The best matches for each of the elements in M are found using the same distance metric. This produces a set of appearance models that may be referred to as N. In this step, pruning is also performed. If the set of matches for an element in M does not contain the model m it is not added to N. The occurrence of models in the set N is then counted. This occurrence count is used to ranked the matches to the model m. Ties in count are handled by comparing the distance from an instance of a model and the model m that is being matched.

In another particular embodiment, the matching of persons and/or other objects in video data is performed by a method referred to as a query by sequences (or more generically known as many-to-many query). Like in the blob method, a covariance matrix is used as the appearance model. Also, as previously disclosed, the situation in a query by sequence is a forensic situation, i.e., motion detection and motion tracking are given. Motion detection provides a foreground mask, and tracking can track objects as they move through the scene recording their bounding rectangles and unique track ID.

Using the bounding rectangles and unique track ID from the tracking and the foreground mask from the motion detection as input, the appearance model for each region in the track (sequence) is computed. Like in the blob method explained above, Equation No. 2 is used to calculate a covariance matrix as the appearance model. The feature set (Equation No. 1) can be expanded to include any features such as edge detection, color intensity, scaled images, etc. In a specific embodiment, a feature set may include the color intensity of each channel R, G, B, the local pixel coordinates, and the x and y gradients in each color channel.

In a particular embodiment, the matching of persons and/or objects in video data is performed by query by sequences (many-to-many). The sequences are processed as follows: a sequence $S^{(k)}$ is composed of a finite number n regions. After preprocessing, each region is represented by its appearance model $C_i^{(k)}$, i=1, 2, ..., n. For sequence representation, an objective uses a compact and descriptive set $r_j^{(k)}$, j=1, ..., m, where m<<n to represent sequence $S^{(k)}$, that is, $$S^{(k)}: C_i^{(k)}, i=1,2,\ldots,n \Rightarrow r_j^{(k)}, j=1,\ldots,m \quad (4)$$

In a first step, a clustering algorithm is performed on each region belonging to the sequence $C_i^{(k)}$, i=1, 2, ..., n. One such clustering algorithm performs hierarchical agglomerative clustering. The implementation of the hierarchical agglomerative clustering is as follows, there are n initial groups, each of these groups containing only a single region. At each step, the closest pair of groups (clusters) is merged. As for the proximity between groups (clusters), an average linkage proximity can be used, which is the average pair-wise proximities (average length of edges), such that $$\text{proximity}=\text{average}\{\rho(C_i,C_j)\} \quad (5)$$

wherein $C_i$ and $C_j$ are from different groups (clusters). There are two ways to stop merging groups, one is to set the number of clusters and the other is to set the threshold of proximity between groups.

The resulting clusters may have valid clusters and invalid clusters. The invalid clusters are outliers. A relatively simple method may be used to determine outliers. For example, the number of objects within each cluster may be counted, and clusters with less than a threshold number of objects are deleted. The obtained clusters correspond to valid groups $G_1, \ldots, G_m$ wherein m is the number of valid groups. In each valid group, there are numbers of regions, so a representative region for each group is calculated.

Next, a representative region $r_k$ for each group $G_k$ is calculated, using the following formula:

$$i=\text{argmin}_{j \neq i}\Sigma(\rho(C_i,C_j)), i,j \subset 1, \ldots, n_k \quad (6)$$

wherein $n_k$ is the number of region within a valid group $G_k$. After the processing, each sequence (track) is represented by representative region, $r_1, \ldots, r_m$, wherein m is the number of valid clusters for the sequence and m<<n. Therefore, the process can be summarized as first performing clustering on each regions' appearance model, here on the clustering on a covariance matrix $C_i^{(k)}$, i=1, 2, \ldots, n and using the distance as calculated by Equation No. (3), detecting an invalid group and removing them as outliers, and calculating the representative region $r_1, \ldots, r_m$ for valid groups $G_1, \ldots, G_m$.

As pointed out above, each sequence (track) is represented by representative regions, $r_1, \ldots, r_m$, wherein m is the number of valid clusters. Sequence matching can be performed between a query video data and video data stored in a database. A distance between query video data $S^{(q)}$ and candidate video data $S^{(p)}$ is defined. It is noted that several distance definition between sets can be used. One such distance is the Hausdorff distance for the distance between two sequences as listed below in Equation No. 7.

$$d(S^{(q)},S^{(p)})=\max(\min(\rho(r_i^{(q)},r_j^{(p)}))) \quad (7)$$

wherein $r_i^{(q)}$ is a representative region for valid clusters from the query video data and $r_i^{(p)}$ is a representative region for valid clusters from the queried (or candidate) video data respectively. To perform the actual query, the Hausdorff distance is compared, and the top 5% of sequences are identified from the database. Moreover, after the distance (Equation No. 7) between every two video data sequences are set up, the occurrence ranking method, described above 19, can be used for reporting the matches to the query.

Figure 8:
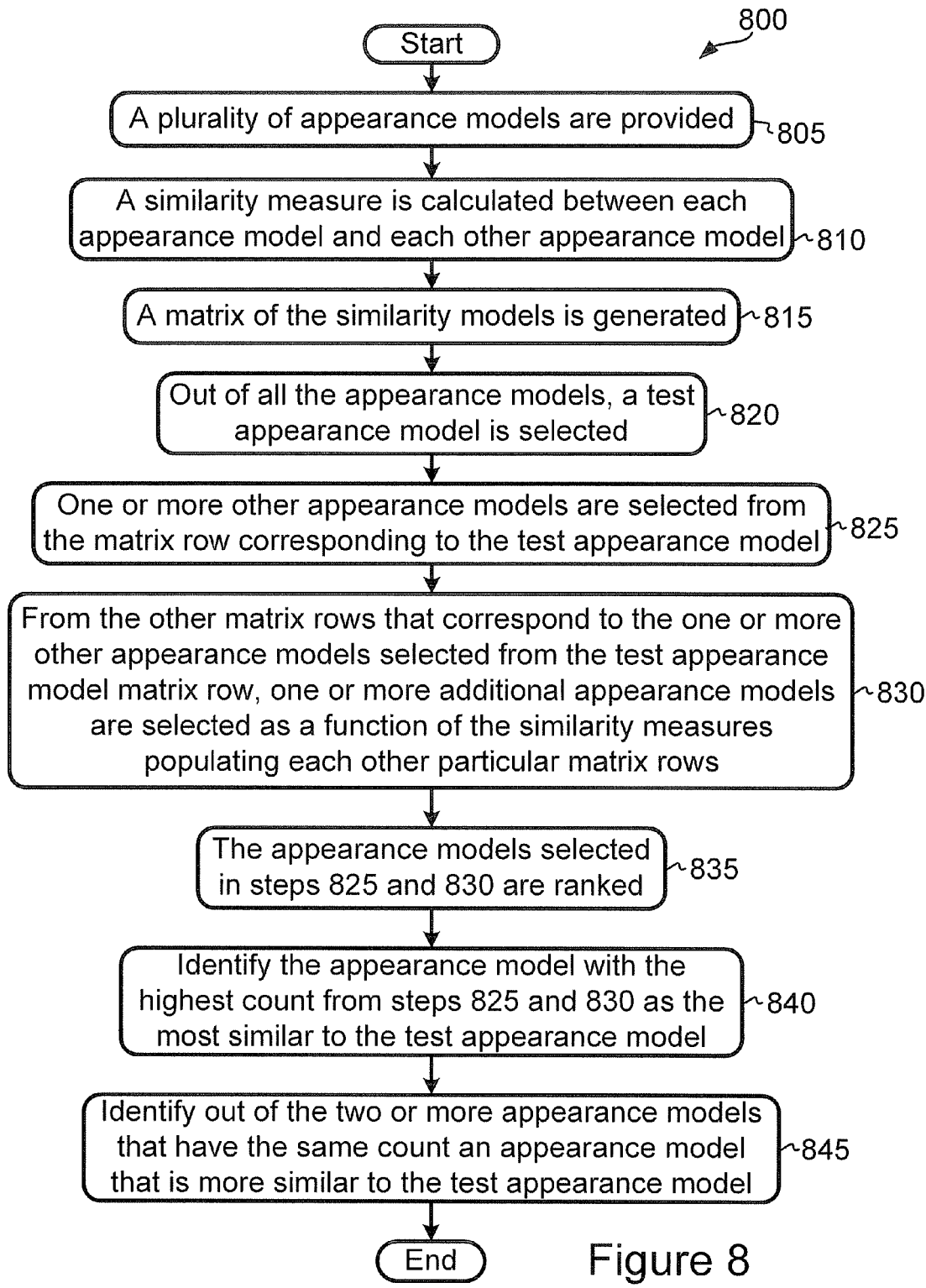
FIG. 8 illustrates an example embodiment of a process to sequence match in video data using clustering as a function of covariance appearance.

FIG. 8 illustrates an example embodiment of a process 800 for sequence matching using clustering on covariance appearance. At 805, a plurality of appearance models is provided. Any type of an appearance model known in the art of video processing may be used. For example, in one or more embodiments, an appearance model consists of a fusion of the features of an object. Features may include such parameters as the height of an object, the shape of an object, and the color of an object, just to name a few. An object is a specific region in a video frame. At 810, a similarity measure is calculated between each appearance model and each other appearance model. At 815, a matrix of the similarity models is generated. At 820, out of all the appearance models, a test appearance model is selected. The test appearance model is the model that is going to be searched for in all of the other appearance models. For example, if there is a database of video surveillance data from shopping mall cameras, and one would like to determine where in the shopping mall a particular person was, then the appearance model for that person is selected, and it is used to compare against all the other appearance models generated by the system.

After the test appearance model is selected at 820, then at 825, one or more other appearance models are selected from the matrix row corresponding to the test appearance model. These one or more other appearance models are selected as a function of the similarity measures for all the models in that matrix row. In a particular embodiment, the one or more other appearance models are selected because their appearance models are similar to the test appearance model, as indicated by a relatively low similarity model number for that particular appearance model. After the similar appearance models are selected from the matrix row of the test appearance model, then at 830, from the other matrix rows that correspond to the one or more other appearance models selected from the test appearance model matrix row, one or more additional appearance models are selected as a function of the similarity measures populating each other particular matrix rows. At 835, the appearance models selected in steps 825 and 830 are ranked. In an embodiment, the appearance models are ranked by the number of times (or the count) that a particular appearance model was selected in steps 825 and 830.

At 840, the process 800 identifies the appearance model with the highest count from steps 825 and 830 as the most similar to the test appearance model. In some cases, two or more appearance models may have equal counts from steps 825 and 830. In such a case, the process 800 may, at 845, identify out of the two or more appearance models that have the same count, an appearance model that is more similar to the test appearance model. In an embodiment, this is determined as a function of the similarity measure of that appearance model in the matrix.

The appearance models of process 800 may originate from a plurality of video sensing devices comprising a plurality of fields of view (e.g., video cameras 170, 172, 174, 176). In general, the appearance models are calculated from a fusion of features of an object in a given image. In a particular embodiment, an appearance model is calculated by the following:

$$C=\Sigma(f_k-\mu_R)(f_k-\mu_R)^T;$$

wherein $\mu_R$ is a vector of the means of corresponding features for points within a region;

T indicates a transpose of the vector; and $$f_k=[x,y,I(x,y),I_x(x,y),I_y(x,y)];$$

wherein $f_k$ comprises a feature set of spatial attributes x y, I(x,y) corresponds to red, green, and blue channels at location x and y, $I_x(x,y)$ corresponds to an x gradient in red, green, and blue channels, and $I_y(x,y)$ corresponds to a y gradient in red, green, and blue channels. Additionally, the similarity measures may be calculated as follows:

$$\rho(C_i, C_j) = \sqrt{\sum_{k=1}^{d} \ln^2 \lambda_k (C_i, C_j)};$$

wherein d is a dimension of the matrix and $\lambda_k$ represents generalized eigenvalues of the appearance models $C_i$ and $C_j$.

FIG. 9 illustrates an example of a matrix 900 of similarity measures for several different appearance models M1-M9. For example, the value in location (M5, M7) represents the similarity measure between the appearance model M5 and M7, which in this example is equal to 12. Then, for example, if it is desired to query on M4 (that is, in what fields of view M1-M9 does the appearance model M4 appear), the M4 row is analyzed to determine which other appearance models are most similar to M4. A smaller number indicates that an appearance model is similar to another appearance model (and a value of 0 indicates that they are the same appearance models). Therefore, if the system is configured to return the three most similar appearance models, the query on M4 returns M3, M5, and M1. Then, similar queries are performed using the matrix rows corresponding to the appearance models M3, M5, and M1. For the M3 query, M4, M5, and M7 are returned. For the M5 query, M1, M6, and M4 are returned. And for the M1 query, M5, M4, and M6 are returned.

After the first and second queries, the counts of the appearance models are tallied. In this example, M1 was returned 2 times, M3 was returned 1 time, M4 was returned 3 times, M5 was returned 3 times, M6 was returned 2 times, and M7 was returned 1 time. In an embodiment, the system is configured to return the top 3 appearance models by count—in this example, M5, M1, and M6 (M4 was removed since it is the model on which the query is being performed). In this example, it is noteworthy that M3 was eliminated because while it was similar to the query model M4, it was not similar to any of the other appearance models that were similar to the query model.

A benefit of this system and method is that there is no threshold placed on the similarity metric. This is beneficial because an object will look different in different video sensing devices. Therefore, a single threshold would not hold across all of the devices. While a system could assign a threshold for every pair of video sensing devices in a system, for large systems that is a very time consuming task and it still does not account for dynamic differences in the devices such as lighting.

Figure 10:
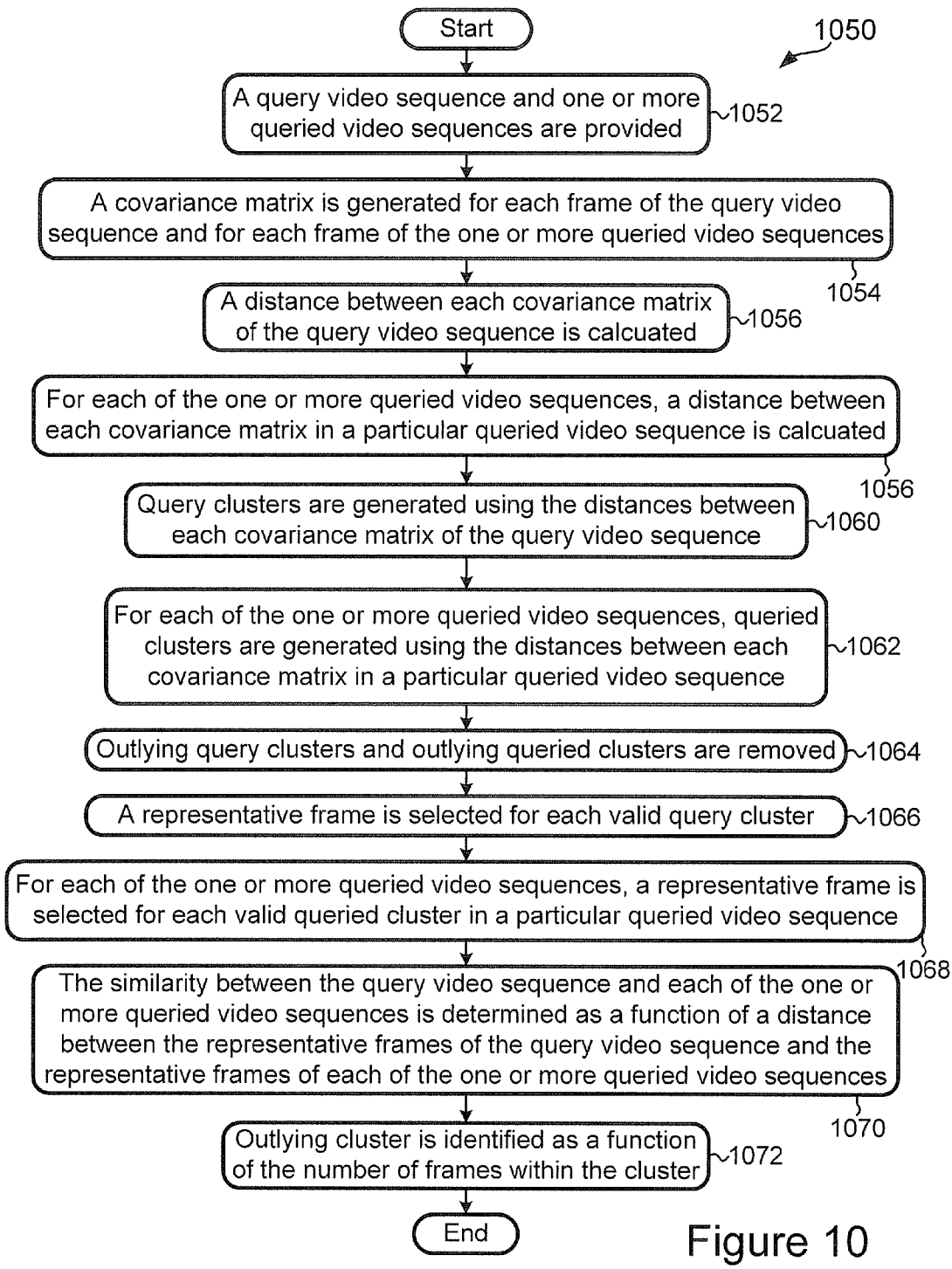
FIG. 10 illustrates another example embodiment of a process to sequence match in video data using clustering as a function of covariance appearance.

FIG. 10 illustrates another example embodiment of a process 1050 for sequence matching using clustering on covariance appearance. At 1052, a query video sequence and one or more queried video sequences are provided. The process 1050 determines if the query video sequence is present in one or more of the queried video sequences. At 1054, a covariance matrix is generated for each region of the query video sequence and for each region of the one or more queried video sequences. At 1056, a distance between each covariance matrix of the query video sequence is calculated. Then, at 1058, for each of the one or more queried video sequences, a distance between each covariance matrix in a particular queried video sequence is calculated. At 1060, query clusters are generated using the distances between each covariance matrix of the query video sequence. At 1062, for each of the one or more queried video sequences, queried clusters are generated using the distances between each covariance matrix in a particular queried video sequence. At 1064, outlying query clusters and outlying queried clusters are removed. The removal of these outliers results in valid query clusters and valid queried clusters. At 1066, a representative region is selected for each valid query cluster. At 1068, for each of the one or more queried video sequences, a representative region is selected for each valid queried cluster in a particular queried video sequence. At 1070, the similarity between the query video sequence and each of the one or more queried video sequences is determined as a function of a distance between the representative regions of the query video sequence and the representative regions of each of the one or more queried video sequences. In an embodiment, the covariance matrix of process 1050 is made up of an x pixel position, a y pixel position, a red channel, a green channel, a blue channel, an x and y gradient for the red channel, an x and y gradient for the green channel, and an x and y gradient for the blue channel:

$$f_k = [x, y, R(x,y), R_x(x,y), R_y(x,y), G(x,y), G_x(x,y), G_y(x,y), B(x,y), B_x(x,y), B_y(x,y)]$$

In an embodiment, the distance between each covariance matrix is calculated by:

$$\rho(C_i, C_j) = \sqrt{\sum_{k=1}^{d} \ln^2 \lambda_k (C_i, C_j)};$$

wherein
d is a dimension of the covariance matrix and $\lambda_k$ represents generalized eigen values of the appearance models; and $$C = \Sigma (f_k - \mu_R)(f_k - \mu_R)^T;$$

wherein
$\mu_R$ is a vector of the means of corresponding features for points within a region;
T indicates a transpose of the vector; and $$f_k = [x, y, I(x,y), I_x(x,y), I_y(x,y)];$$

wherein $f_k$ comprises a feature set of spatial attributes x y, I(x,y) corresponds to red, green, and blue channels at location x and y, $I_x(x,y)$ corresponds to an x gradient in red, green, and blue channels, and $I_y(x,y)$ corresponds to a y gradient in red, green, and blue channels:

$$f_k = [x, y, R(x,y), R_x(x,y), R_y(x,y), G(x,y), G_x(x,y), G_y(x,y), B(x,y), B_x(x,y), B_y(x,y)]$$

At 1072, an outlying cluster is identified as a function of the number of regions within the cluster.

In an embodiment, the representative region is selected by the following:

$$i = \mathrm{argmin}_{j \neq i} \Sigma(\rho(C_i, C_j)), i, j \subset 1, \ldots, n_k;$$

wherein $n_k$ represents the number of regions in the cluster k;
and $\rho(C_i, C_j)$ represents a distance between an ith region in the cluster and a jth region in the cluster.

The distance between the valid regions of the query video data and the valid regions of each of the one or more queried video data may be calculated as a Hausdorff distance.

Figure 11:
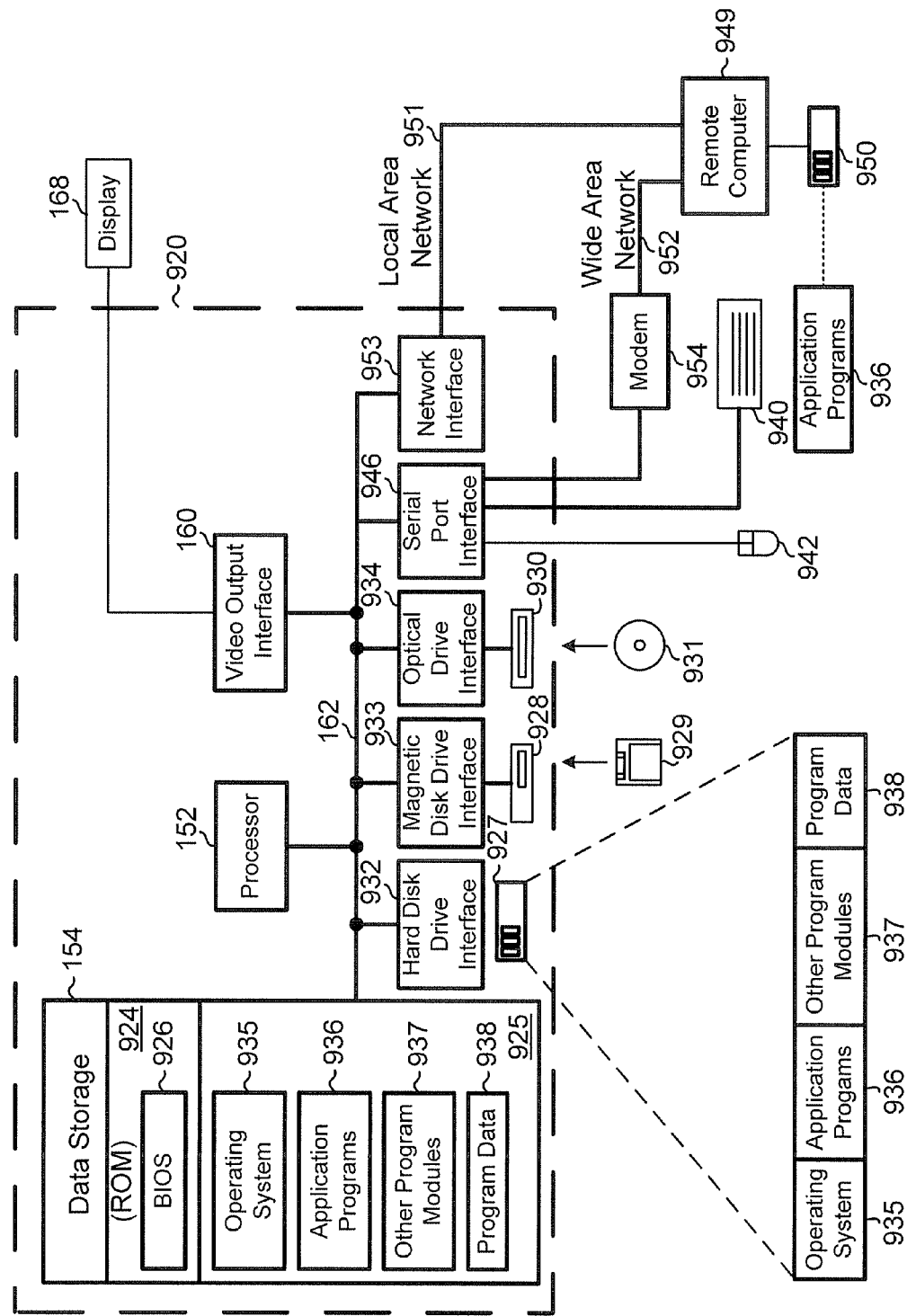
FIG. 11 illustrates an example embodiment of a computer system upon which one or more embodiments of the present disclosure may operate.

Next, FIG. 11 depicts additional details of system 150. As shown in FIG. 11, system 150 includes a general purpose computing device in the form of a computer 920 (e.g., a personal computer, workstation, or server). In various embodiments, computer 920 is a conventional computer, a distributed computer, or any other type of computer.

The system bus 162 can be any of several types of bus structures including a memory bus or memory controller, a peripheral bus, and a local bus using any of a variety of bus architectures. The data storage 154 can also be referred to as simply the memory, and, in some embodiments, includes read-only memory (ROM) 924 and random-access memory (RAM) 925. A basic input/output system (BIOS) program 926, containing the basic routines that help to transfer information between elements within the computer 920, such as during start-up, may be stored in ROM 924. The computer 920 further includes a hard disk drive 927 for reading from and writing to a hard disk, not shown, a magnetic disk drive 928 for reading from or writing to a removable magnetic disk 929, and an optical disk drive 930 for reading from or writing to a removable optical disk 931 such as a CD ROM or other optical media.

The hard disk drive 927, magnetic disk drive 928, and optical disk drive 930 couple with a hard disk drive interface 932, a magnetic disk drive interface 933, and an optical disk drive interface 934, respectively. The drives and their associated computer-readable media provide non-volatile storage of computer-readable instructions, data structures, program modules and other data for the computer 920. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 929, optical disk 931, ROM 924, or RAM 925, including an operating system 935, one or more application programs 936, other program modules 937, and program data 938. A plug in containing a security transmission engine can be resident on any one or number of these computer-readable media.

A user may enter commands and information into computer 920 through input devices such as a keyboard 940 and pointing device 942. Other input devices (not shown) can include a microphone, joystick, game pad, scanner, or the like. These other input devices are often connected to the processor 152 through a serial port interface 946 that is coupled to the system bus 162, but can be connected by other interfaces, such as a parallel port, game port, or a universal serial bus (USB). Computer 920 may include other peripheral output devices (not shown), such as speakers and printers.

The computer 920 may operate in a networked environment using logical connections to one or more remote computers or servers, such as remote computer 949. These logical connections are achieved by a communication device coupled to or a part of the computer 920; the examples in the disclosure are not limited to a particular type of communications device. The remote computer 949 can be another computer, a server, a router, a network PC, a client, a peer device or other common network node, and typically includes many or all of the elements described above I/O relative to the computer 920, although only a memory storage device 950 has been illustrated. The logical connections depicted in FIG. 11 include a local area network (LAN) 951 and/or a wide area network (WAN) 952. Such networking environments are commonplace in office networks, enterprise-wide computer networks, intranets and the internet, which are all types of networks.

When used in a LAN-networking environment, the computer 920 is connected to the LAN 951 through a network interface or adapter 953, which is one type of communications device. In some embodiments, when used in a WAN-networking environment, the computer 920 typically includes a modem 954 (another type of communications device) or any other type of communications device, e.g., a wireless transceiver, for establishing communications over the wide-area network 952, such as the Internet. The modem 954, which may be internal or external, is connected to the system bus 923 via the serial port interface 946. In a networked environment, program modules depicted relative to the computer 920 can be stored in the remote memory storage device 950 of remote computer, or server 949. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

6. Conclusion

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. A method comprising:
   storing a plurality of video frames and analytical data corresponding to a plurality of video objects, wherein each video object of the plurality of video objects is displayable by displaying a video frame of the plurality of video frames that comprises that video object;
   receiving a selection of a video object displayable in a given video frame of the plurality of video frames;
   searching a subset of the analytical data so as to identify a number of video objects that most closely match the selected video object and to create a first list, wherein the first list identifies the number of video objects that most closely match the selected video object;
   for each video object identified in the first list, searching the analytical data so as to identify video objects of the plurality of video objects that most closely match that video object identified in the first list;
   for each identified video object that most closely matches a video object identified in the first list, counting a number of occurrences that that video object is identified as a video object that most closely matches a video object identified in the first list;
   creating a second list, wherein the second list indicates the counted number of occurrences for each identified video object that most closely matches a video object identified in the first list; and
   using the second list to identify a set of video frames of the plurality of video frames to be displayed.

2. The method of claim 1, wherein the first list further identifies the selected video object.

3. The method of claim 2,
   wherein the plurality of video frames comprises video frames captured by a plurality of video cameras.

4. The method of claim 3, wherein at least a portion of the plurality of video cameras are non-overlapping cameras that capture video frames for distinct areas.

5. The method of claim 2, wherein the selected video object is an object selected from the group consisting of (i) a person, (ii) a group of people, (iii) a vehicle, (iv) an item carried by a person, (v) an item carried by a group of people, (vi) an animal, and (vii) any arbitrary object in the given video frame.

6. The method of claim 2,
wherein storing the plurality of video frames and the analytical data comprises storing the plurality of video frames and the analytical data in data storage, and
wherein storing the plurality of video frames in data storage comprises storing a plurality of video files that, in combination, represent the plurality of video frames.

7. The method of claim 2,
wherein the analytical data corresponding to the plurality of video objects comprises for each video object data selected from the group consisting of (i) color data, (ii) pixel intensity data, (iii) data indicating which pixels are part of that video object, (iv) a unique identifier of the video object, and (v) structural information associated with that video object.

8. The method of claim 2,
wherein the subset of analytical data comprises analytical data corresponding to video objects displayable in video frames having a highest probability of comprising video objects that most closely match the selected video object.

9. The method of claim 8,
wherein the video frames having the highest probability of comprising video objects that most closely match the selected video object comprise video frames captured during a contiguous period of time, and
wherein the given video frame is one of the video frames captured during the contiguous period of time.

10. The method of claim 8,
wherein the plurality of video frames are captured by a plurality of video cameras including at least a first video camera and a second video camera,
wherein the video frames having the highest probability of comprising video objects that most closely match the selected video object comprise video frames captured only by the first video camera, and
wherein the given video frame was captured by the first video camera.

11. A tangible, non-transitory computer-readable storage medium comprising program instructions executable to carry out a process comprising:
storing a plurality of video frames and analytical data corresponding to a plurality of video objects, wherein each video object of the plurality of video objects is displayable by displaying a video frame of the plurality of video frames that comprises that video object;
receiving a selection of a video object displayable in a given video frame of the plurality of video frames;
searching a subset of the analytical data so as to identify a number of video objects that most closely match the selected video object and to create a first list, wherein the first list identifies the number of video objects that most closely match the selected video object;
for each video object identified in the first list, searching the analytical data so as to identify video objects of the plurality of video objects that most closely match that video object identified in the first list;
for each identified video object that most closely matches a video object identified in the first list, counting a number of occurrences that that video object is identified as a video object that most closely matches a video object identified in the first list;
creating a second list, wherein the second list indicates the counted number of occurrences for each identified video object that most closely matches a video object identified in the first list; and
using the second list to identify a set of video frames of the plurality of video frames to be displayed.

12. A system comprising:
a processor;
data storage for storing: (i) a plurality of video frames, (ii) analytical data corresponding to a plurality of video objects, and (iii) program instructions executable by the processor; and
a user interface to display video frames and to receive a selection of a video object displayed in a given video frame of the plurality of video frames;
wherein the plurality of video objects are displayable by displaying the plurality of video frames via the user interface,
wherein the program instructions comprise instructions that cause the processor to:
(i) search a subset of the analytical data so as to identify a number of video objects that most closely match the selected video object and to create a first list, wherein the first list identifies the number of video objects that most closely match the selected video object,
(ii) for each video object identified in the first list, search the analytical data so as to identify video objects of the plurality of video objects that most closely match that video object identified in the first list,
(iii) for each identified video object that most closely matches a video object identified in the first list, count a number of occurrences that that video object is identified as a video object that most closely matches a video object identified in the first list,
(iv) create a second list, wherein the second list indicates the counted number of occurrences for each identified video object that most closely matches a video object identified in the first list, and
(v) use the second list to identify a set of video frames of the plurality of video frames to be displayed.

* * * * *